(12) United States Patent
Singh et al.

(10) Patent No.: US 10,311,480 B2
(45) Date of Patent: Jun. 4, 2019

(54) METHOD AND SYSTEM FOR RECEIVING TARGETED CONTENT

(71) Applicant: Conduent Business Services, LLC, Dallas, TX (US)

(72) Inventors: Atul Singh, Bangalore (IN); Geetha Manjunath, Bangalore (IN); Shailesh Vaya, Bangalore (IN); Bhupendra Singh Solanki, Indore (IN); Shubhi Sharma, Bangalore (IN); Aritra Dhar, West Bengal (IN)

(73) Assignee: Conduent Business Services, LLC, Dallas, TX (US)

( * ) Notice: Subject to any disclaimer, the term of this patent is extended or adjusted under 35 U.S.C. 154(b) by 435 days.

(21) Appl. No.: 15/018,944

(22) Filed: Feb. 9, 2016

(65) Prior Publication Data
US 2017/0228784 A1    Aug. 10, 2017

(51) Int. Cl.
| | | |
|---|---|---|
| G06Q 30/00 | (2012.01) | |
| G06Q 30/02 | (2012.01) | |
| H04L 29/08 | (2006.01) | |
| H04W 4/02 | (2018.01) | |
| H04W 4/80 | (2018.01) | |

(52) U.S. Cl.
CPC ..... *G06Q 30/0261* (2013.01); *G06Q 30/0255* (2013.01); *G06Q 30/0267* (2013.01); *H04L 67/18* (2013.01); *H04L 67/306* (2013.01); *H04W 4/023* (2013.01); *H04W 4/80* (2018.02)

(58) Field of Classification Search
None
See application file for complete search history.

(56) References Cited

U.S. PATENT DOCUMENTS

| | | |
|---|---|---|
| 8,626,818 B2 | 1/2014 | Suresh |
| 8,843,393 B2 | 9/2014 | Beavers et al. |
| 2005/0080665 A1 | 4/2005 | Bowman-Amuah |
| 2005/0234771 A1 | 10/2005 | Register et al. |
| 2011/0225044 A1 | 9/2011 | Duffy |

(Continued)

FOREIGN PATENT DOCUMENTS

EP     2026268 A1    2/2009

OTHER PUBLICATIONS

"Thumbnail Selection : Delivering Digital Signage Contents to Mobile Phone;" Gisung, Kim, Soobin, Lee, Joon ,Young Park, Sungkwan, Jung, Sangsik, Kim, Yong-chul, Shin; KAIST Institute; pp. 1-5.

*Primary Examiner* — Meredith A Long
(74) *Attorney, Agent, or Firm* — Jones Robb, PLLC

(57) ABSTRACT

A method and a system for receiving targeted content are disclosed. In an embodiment, in a mobile device at least a first metadata corresponding to a first content displayed on a digital signage board is received, based on a predetermined action performed by the mobile device. The first metadata comprises at least a location of the digital signage board. A second metadata corresponding to one or more product categories associated with one or more products in vicinity of the digital signage board is determined, based on the location of the digital signage board. One or more user preferences are determined based on the first metadata and the second metadata. The targeted content is received on the mobile device based on the one or more user preferences.

14 Claims, 13 Drawing Sheets

(56) References Cited

U.S. PATENT DOCUMENTS

| | | |
|---|---|---|
| 2011/0302026 A1 | 12/2011 | Kanakarajan et al. |
| 2013/0198004 A1* | 8/2013 | Bradley ............. G06Q 30/0267 |
| | | 705/14.64 |
| 2013/0290106 A1* | 10/2013 | Bradley ................ G06Q 90/20 |
| | | 705/14.64 |
| 2013/0317916 A1 | 11/2013 | Gopalakrishnan et al. |
| 2014/0308932 A1 | 10/2014 | Lee et al. |

* cited by examiner

METHOD AND SYSTEM FOR RECEIVING TARGETED CONTENT

TECHNICAL FIELD

The presently disclosed embodiments are related, in general, to receive content. More particularly, the presently disclosed embodiments are related to a method and a system for receiving targeted content on a mobile device of a user.

BACKGROUND

Shopping complexes or shopping malls have a number of product sections. Examples of the product sections may include electronic sections, clothing sections, and the like. Further, the shopping malls or the shopping complexes may have digital signage boards that are used to display content, such as an advertisement, a notification, a direction, and the like, to a user. The content displayed on the digital signage board may be programmed to change over time. For example, a digital signage board may be configured to display certain content on one day and different content on next day.

In certain scenarios, the user may interact with the digital signage board to get more information on the content being displayed on the digital signage board. Such interactions may provide insights, such as a type of products/product categories that might be of interest to the user. Therefore, it may be desirable to determine such insights and accordingly, transmit targeted advertisement to the user.

Further limitations and disadvantages of conventional and traditional approaches will become apparent to those of skilled in the art, through a comparison of described systems with some aspects of the present disclosure, as set forth in the remainder of the present application and with reference to the drawings.

SUMMARY

According to embodiments illustrated herein, there is provided a method for receiving targeted content. The method comprises, in a mobile device, receiving, by one or more processors, at least a first metadata corresponding to a first content displayed on a digital signage board based on a predetermined action performed by the mobile device. The first metadata comprises at least a location of the digital signage board. The method further comprises, in a mobile device, determining, by the one or more processors, a second metadata corresponding to one or more product categories associated with one or more products in vicinity of the digital signage board, based on the location of the digital signage board. The method further comprises, in a mobile device, determining, by the one or more processors, one or more user preferences based on the first metadata and the second metadata. The method further comprises, in a mobile device, receiving, by the one or more processors, the targeted content based on the one or more user preferences.

According to embodiments illustrated herein, there is provided a mobile device to receive targeted content. The mobile device comprises one or more processors configured to receive at least a first metadata corresponding to a first content displayed on a digital signage board based on a predetermined action performed by the mobile device. The first metadata comprises at least a location of the digital signage board. The one or more processors are further configured to determine a second metadata corresponding to one or more product categories associated with one or more products in vicinity of the digital signage board, based on the location of the digital signage board. The one or more processors are further configured to determine one or more user preferences based on the first metadata and the second metadata. The one or more processors are further configured to receive the targeted content based on the one or more user preferences.

According to embodiments illustrated herein, there is provided a non-transitory computer-readable storage medium having stored thereon, a set of computer-executable instructions for causing a computer comprising one or more processors, configured to receive at least a first metadata corresponding to a first content displayed on a digital signage board based on a predetermined action performed by the mobile device. The first metadata comprises at least a location of the digital signage board. The one or more processors are further configured to determine a second metadata corresponding to one or more product categories associated with one or more products in vicinity of the digital signage board, based on the location of the digital signage board. The one or more processors are further configured to determine one or more user preferences based on the first metadata and the second metadata. The one or more processors are further configured to receive a targeted content based on the one or more user preferences.

BRIEF DESCRIPTION OF DRAWINGS

The accompanying drawings illustrate various embodiments of method and device and other aspects of the disclosure. Any person with ordinary skills in the art would appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
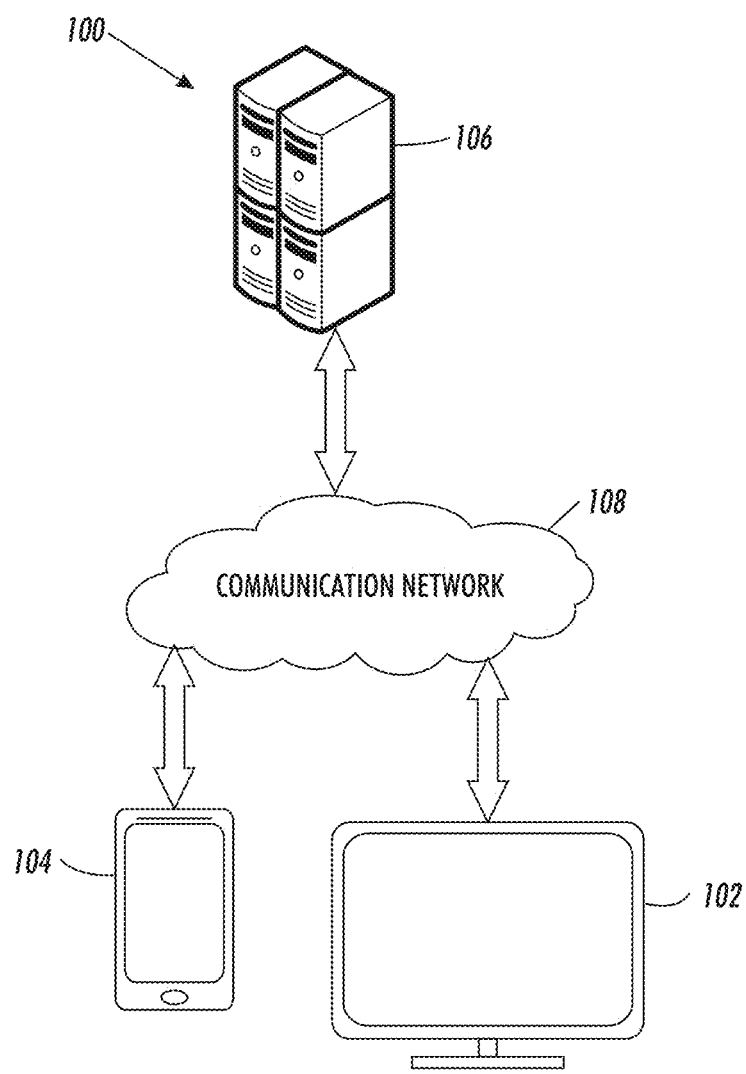
FIG. 1 is a block diagram that illustrates a system environment in which various embodiments of a method and a system may be implemented.

The present disclosure is best understood with reference to the detailed figures and description set forth herein. Various embodiments are discussed below, with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definition: The following terms shall have, for the purposes of this application, the respective meanings set forth below.

"Content" refers to a text, message, audio, or video that may be rendered or displayed on an electronic device. In an embodiment, the content may be pre-stored on the electronic device or may be received over a communication media. Examples of the content may include, but are not limited to, an advertisement, a notification, a direction, and/or the like.

"Targeted content" refers to content that may be communicated to a user on a mobile device. The targeted content may have information that may be of interest to the user. Example of the targeted content may include an advertisement, a video, an audio content, and the like.

A "mobile device" refers to a computing device that includes a processor/microcontroller and/or any other electronic component, or a device or a system that performs one or more operations according to one or more programming instructions. Examples of the mobile device include, but are not limited to, a personal digital assistant (PDA), a mobile phone, a smart-phone, a tablet computer, and the like. The mobile device may be associated with a user. The terminologies "mobile device" and "user mobile device" are used interchangeably in the disclosure herein.

"First metadata" refers to information of a first content displayed on a digital signage board. The first metadata comprises a location of the digital signage board, a product ID, a product name, a product category of the product, a time stamp associated with the first content displayed on the digital signage board, an external URL associated with the product name, and/or a campaign rule associated with the first content.

"Second metadata" corresponds to information pertaining to one or more product categories associated with one or more products in vicinity of a digital signage board.

"Map data" may refer to a schematic of a shopping complex or a shopping mall that includes a first information pertaining to a location of one or more digital signage boards in a store, and one or more product categories associated with one or more products in vicinity of each of one or more digital signage boards in the store. Further, the map data may include information pertaining to the paths/routes between various sections of the shopping complex.

A "digital signage board" refers to a display device that is used to display a first content, such as an advertisement, a notification, a direction, and the like. The digital signage board may be located in a public place, such as a store, a stadium, a hotel, a corporate building, and the like to display the first content to a user. In an embodiment, the digital signage board may have a capability to transmit short-range signals. The short-range signal may define the vicinity of the digital signage board. In an embodiment, the short-range signal may correspond to a Bluetooth signal, a Wi-Fi signal or any other such signal.

A "first campaign" refers to information that include a content, a campaign rule and a schedule defined for the content. In an embodiment, the first campaign may be defined for a mobile device.

A "second campaign" refers to information that include a content, a campaign rule and a schedule defined for the content. In an embodiment, the second campaign may be defined for the digital signage board.

A "product ontology" refers to information pertaining to one or more product categories associated with one or more products. The one or more product categories may be organized or stored in a multi-level category tree in which a first product category may be a parent category of a second product category. Further, the first product category may be a child of a third product category. Therefore, each of the one or more product categories are derived from the parent product category. For example, the parent category of the product category "lighting" may be "electronics". In another example, the parent category of the product category "ink-jet printer" can be "printer".

An "advertisement" may correspond to content that may be communicated to a user through an electronic device. The advertisement may comprise information about one or more products or services. The advertisement may be communicated to the user using a communication media such as an audio, a video, a billboard, a television, a radio, a digital signage board, and the like.

A "user profile" refers to a collection of information about a user, such as a health condition, a diet preference, a travel history, a relationship status, an age, gender information, or a job status. In an embodiment, the user profile may be stored on a mobile device of the user. The user profile may be updated based on one or more user preferences or a predetermined action performed by the user.

"One or more user preferences" correspond to one or more choices, interests, or priorities of a user with respect to one or more products or services. Based on the one or more user preferences, message or information of one or more products may be communicated to the user in the form of an advertisement, a notification, and the like. In an embodiment, the messages or the information may be displayed to the user over the mobile device or the digital signage board. In an embodiment, the one or more user preferences may be updated based on the user input to accept or reject a notification received on the mobile device.

A "machine-readable code" refers to a code that is readable by an electronic device equipped with appropriate scanning apparatus and/or image-processing algorithms.

The machine-readable code may contain a first metadata that corresponds to the first content displayed on the digital signage board. Examples of the machine-readable code (MRC) include, but are not limited to, a one-dimensional bar code, such as a Universal Product Code (UPC), a two-dimensional bar code, such as a Quick Response (QR) code, and a High Capacity Color Barcode, a MaxiCode, and the like.

"One or more product categories" correspond to one or more types of products in a store. The store may have one or more product sections such as an electronics section and a clothing section. The one or more sections may have one or more products of different types. For example, the electronics section in the store may have one or more products, such as a television, an organic light emitting diode (OLED), an eco-friendly television, a digital camera, a mobile phones, and/or the like. The television, the mobile phone, and the digital camera may correspond to the different categories of the products.

A "set of product category" refers to product categories of one or more product categories that may be of interest to the user. In an embodiment, the set of product categories are selected based on campaign rules.

A "notification" refers to information pertaining to a product that is being displayed in a first content on a digital signage board. In an embodiment, the notification may include additional information corresponding to an offer and/or a warranty information of the product. A mobile device of a user may receive the notification with an option of a user input to accept or reject the notification.

FIG. 1 is a block diagram that illustrates a system environment 100 in which various embodiments of a method and a system may be implemented. The system environment 100 includes a digital signage board 102, a mobile device 104, an application server 106, and a communication network 108. Various devices in the system environment 100 may be interconnected over the communication network 108. FIG. 1 shows, for simplicity, one digital signage board 102, one mobile device 104, and one application server 106. However, it will be apparent to a person having ordinary skills in the art that the disclosed embodiments may also be implemented using multiple mobile devices, multiple digital signage boards, and multiple application servers without departing from the scope of the disclosure.

The digital signage board 102 may refer to a display device that may be configured to display a first content, such as an advertisement, a notification, a direction, and the like. The digital signage board 102 may include one or more processors in communication with one or more memories. The one or more memories may include computer-readable code that may be executable by the one or more processors to perform one or more predetermined operations. The digital signage board 102 may display a MRC along with the first content. The MRC may be representative of a first metadata associated with the first content. The first metadata may comprise a location of the digital signage board 102, a product ID, a product name, a product category of the product, a time stamp, associated with the first content displayed on the digital signage board 102, an external URL associated with the product name, and/or a campaign rule associated with the advertisement. In an embodiment, the digital signage board 102 may include a user interface. The user interface may be coupled to the application server 106 over the communication network 108. The digital signage board 102 may receive the first content from the application server 106 over the communication network 108. In an embodiment, the user interface in the digital signage board 102 further includes a wireless transmitter. The digital signage board 102 may transmit a short-range signal through the wireless transmitter. In an embodiment, the range of the wireless transmitter may define the vicinity of the digital signage board 102. In an embodiment, the digital signage board may transmit the first metadata through the wireless transmitter. The digital signage board 102 may be realized through a display device such as smart television, and/or any display device that has the capability to receive the first content from the application server 106.

The mobile device 104 may refer to a computing device that may comprise one or more processors in communication with one or more memories. The one or more memories may include computer readable code that is executable by the one or more processors to perform one or more predetermined operations. A user of the mobile device 104, while traversing through a marketplace such as a shopping mall, may scan the MRC being displayed on the digital signage board 102. In an embodiment, the mobile device 104 may comprise one or more sensors, such as an image sensor, a radio frequency identification (RFID) sensor, or a near field communication (NFC) sensor, that may enable the scanning of the MRC. On scanning the MRC, the mobile device 104 may extract the first metadata associated with the first content being displayed on the digital signage board 102 from the MRC. In an alternate embodiment, the mobile device 104 may receive the first metadata over the short-range signal being transmitted by the digital signage board 102. Based on the first metadata, the mobile device 104 may determine the location of the digital signage board 102. Based on the location of the digital signage board 102, the mobile device 104 may determine a second metadata corresponding to one or more product categories of one or more products in vicinity of the digital signage board 102. In an embodiment, the mobile device 104 may extract the second metadata from the map data of the marketplace. Based on the first metadata and the second metadata, the mobile device 104 may determine one or more user preferences. In an embodiment, the mobile device 104 may update a user profile of the user based on the determined one or more user preferences. The mobile device 104 may receive one or more campaign rules, corresponding to one or more first campaigns, from the application server 106. Based on the user profile and the one or more campaign rules, the mobile device 104 may select a set of user preferences from the user profile. In an embodiment, the mobile device 104 may transmit the set of user preferences to the application server 106 to retrieve targeted content. Examples of the mobile device 104 may include, but are not limited to, a personal computer, a laptop, a personal digital assistant (PDA), a smartphone, a tablet, or any other computing device.

The application server 106 may be configured to define one or more first campaigns and one or more second campaigns. In an embodiment, the one or more first campaigns may be intended for the mobile device 104. In an embodiment, the one or more second campaigns may be intended for the digital signage board 102. In an embodiment, the application server 106 may present a user interface to an administrator that may enable the administrator to define the one or more first campaigns and the one or more second campaigns. In an embodiment, while defining the one or more first campaigns and the one or more second campaigns, the administrator may further define the targeted content and the first content, respectively. Further, the administrator may define the one or more campaign rules for each of the one or more first campaigns and the one or more second campaigns. In an embodiment, the administrator may further define a schedule for each of the one or more first campaigns and the one or more second campaigns. In an embodiment, while defining the one or more second campaigns, the administrator may further define the first metadata associated with the first content.

In an embodiment, the application server 106 may further configured to broadcast the one or more campaign rules associated with the one or more first campaigns to the mobile device 104. In an embodiment, the application server 106 may transmit the targeted content to the mobile device 104 based on the received set of user preferences. In an embodiment, the application server 106 may transmit the first content, associated with the one or more second campaigns, to be displayed on the digital signage board 102.

The application server 106 further stores a map data of a store. In an embodiment, the map data may be stored in accordance with GEO Json or Indoor GML standards. The map data comprises a first information pertaining to the location of one or more digital signage boards in the store, and the one or more product categories associated with the one or more products in vicinity of each of the one or more digital signage boards. In an embodiment, the application server 106 may transmit the map data of the store to the mobile device 104. In an embodiment, the application server 106 may store a set of instructions, codes, programs, algorithms, and/or the like, which may be extracted by the mobile device 104 to execute the one or more predetermined operations. Examples of the application server 106 may include, but not limited to, a relational database server, a SAP server, a PeopleSoft® server, a Siebel server, and the like.

The communication network 108 may include a medium through which devices, such as the digital signage board 102, the mobile device 104, and the application server 106, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long-term Evolution (LTE), and/or Bluetooth (BT) communication protocols.

Figure 2:
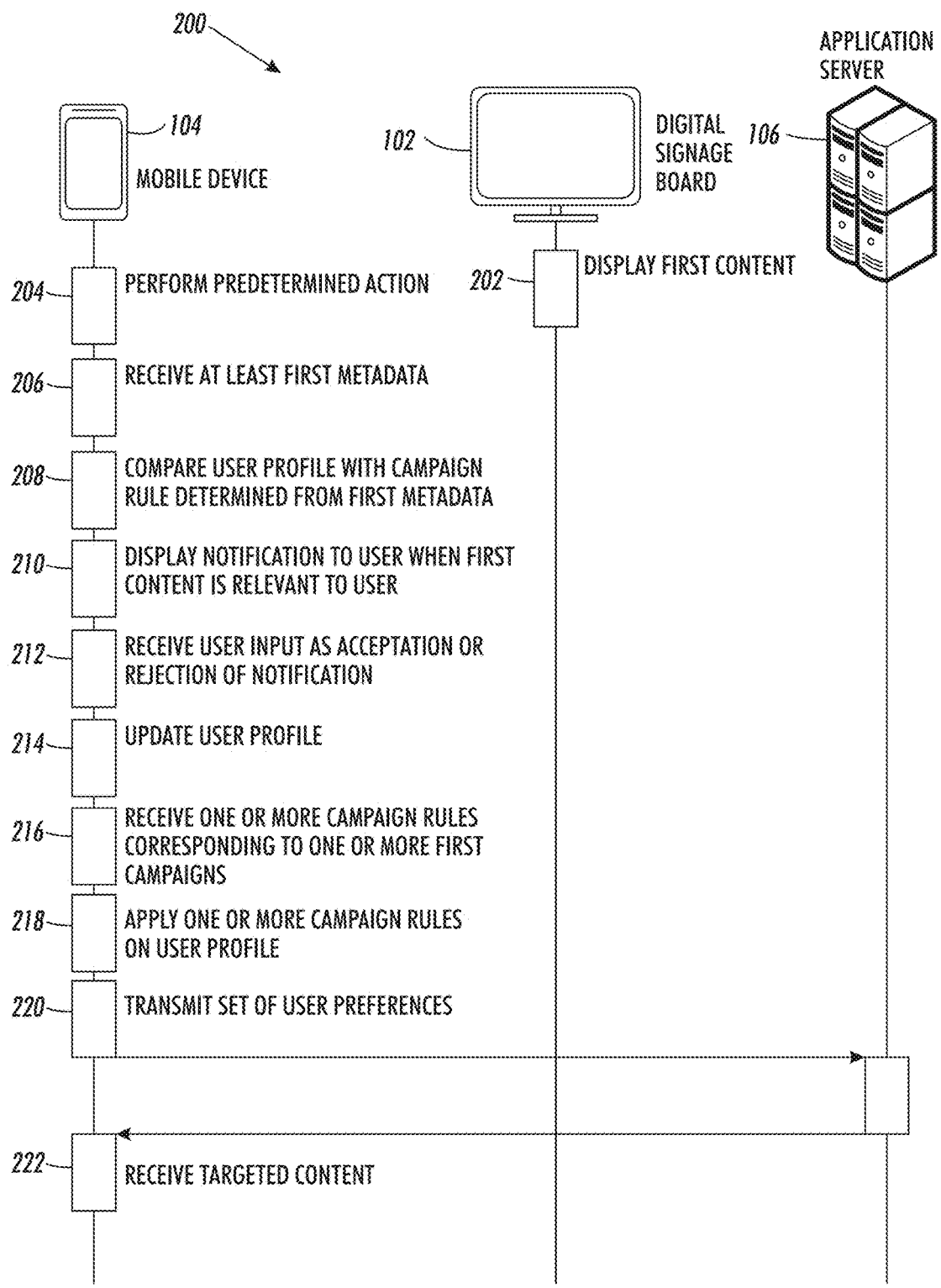
FIG. 2 is a block diagram that illustrates an interaction between a digital signage board, a mobile device, and an application server, in accordance with at least one embodiment.

FIG. 2 is a block diagram 200 that illustrates an interaction between the digital signage board 102, the mobile device 104, and the application server 106, in accordance with at least one embodiment. FIG. 2 is explained in conjunction with the elements described in FIG. 1. The block diagram 200 includes the digital signage board 102, the mobile device 104, and the application server 106.

During interaction denoted by 202, the digital signage board 102 may be configured to display a first content. In an embodiment, the first content may correspond to an advertisement of a product. In an embodiment, the digital signage board 102 may receive the first content in accordance with the one or more second campaigns defined at the application server 106. Further, the digital signage board 102 may display the first content in accordance with the schedule associated with the one or more second campaigns. In an embodiment, the digital signage board 102 may be configured to display the MRC, along with the first content. In an embodiment, the MRC may be representative of the first metadata associated with the first content. In addition, the digital signage board 102 may transmit the first metadata over the short-range signal.

During interaction denoted by 204, the mobile device 104 may be configured to perform a predetermined action that corresponds to scanning of a MRC displayed on the digital signage board 102. In an embodiment, when the user of the mobile device 104 scan the MRC, the user may be interested in the product corresponding to the first content. In an alternate embodiment, the predetermined action may correspond to the mobile device 104 being in vicinity of the digital signage board 102.

During interaction denoted by 206, the mobile device 104 may be configured to receive at least the first metadata that corresponds to the first content displayed on the digital signage board 102 based on the predetermined action performed by the mobile device 104. In a scenario, when the predetermined action corresponds to the scanning of the MRC, the mobile device 104 may extract the first metadata from the MRC. In an alternate embodiment, the user may receive the first metadata over the short-range signal, when the user has not explicitly scanned the MRC and is in vicinity of the digital signage board 102.

During interaction denoted by 208, the mobile device 104 may compare the user profile with the campaign rule, determined from the first metadata. In an embodiment, the interaction denoted by 208 may be performed when the first metadata is received over the short-range signal. In an embodiment, based on the comparison, the mobile device 104 may determine whether the first content is relevant to the user.

During interaction denoted by 210, the mobile device 104 may display a notification to the user, when the first content is relevant to the user. The relevancy of the first content may be determined during the interaction denoted by 208. In an embodiment, the notification pertains to product that is being displayed in the first content. During interaction denoted by 212, the user may provide an input to either accept or reject the notification.

During interaction denoted by 214, the user profile may be updated. In an embodiment, the user profile may be updated based on the user input pertaining to either acceptance or rejection of the notification. In an alternate embodiment, the user profile may be updated when the user scans the MRC displayed on the digital signage board 102. In an embodiment, when the user scans the MRC, the user explicitly expresses interest in the product corresponding to the first content. In an alternate embodiment, when the user provides input as acceptation or rejection the notification, the user implicitly expresses interest in the product corresponding to the first content. For the purpose of the ongoing description, it may be assumed that the user has shown interest in the product.

The mobile device 104 may determine a location of the digital signage board 102 in the store. In an embodiment, the location of the digital signage board 102 may be determined from the first metadata. Thereafter, the mobile device 104 may utilize the map data to determine the location of the digital signage board 102 in the store. Based on the determined location of the digital signage board 102, the mobile device 104 may determine a second metadata that corresponds to one or more product categories associated with one or more products in vicinity of the digital signage board 102. Further, the mobile device 104 may determine the one or more product categories associated with the product corresponding to the first content.

The mobile device 104 may be further configured to assign a weight to each of the one or more product categories associated with the product corresponding to the first content and the one or more products in vicinity of the digital signage board 102. In an embodiment, the weight may indicate the importance of the category with respect to the other categories, to the user. The mobile device 104 may be configured to compare the weight assigned to each of the one or more product categories with a pre-defined threshold.

The mobile device 104 may be further configured to determine one or more user preferences based on the comparison of the weight assigned to each of the one or more product categories, with a pre-defined threshold. In an embodiment, a set of product category from the one or more product categories may be selected based on the comparison. The selected set of product category may correspond to the one or more user preferences. In an embodiment, the mobile device 104 may update the user profile based on the determined one or more user preferences.

During interaction denoted by 216, the mobile device 104 may receive one or more campaign rules, corresponding to the one or more first campaigns, from the application server 106.

During interaction denoted by 218, the mobile device 104 may apply the one or more campaign rules on the user profile to identify a set of first campaigns that are relevant to the user. Further, the mobile device 104 may identify a set of user preferences from the user profile that may correspond to the identified set of first campaigns. During interaction denoted by 220, the mobile device 104 transmits the set of user preferences to the application server 106 using oblivious transfer protocol. During interaction denoted by 222, the mobile device 104 receives the targeted content based on the set of user preferences.

Figure 3:
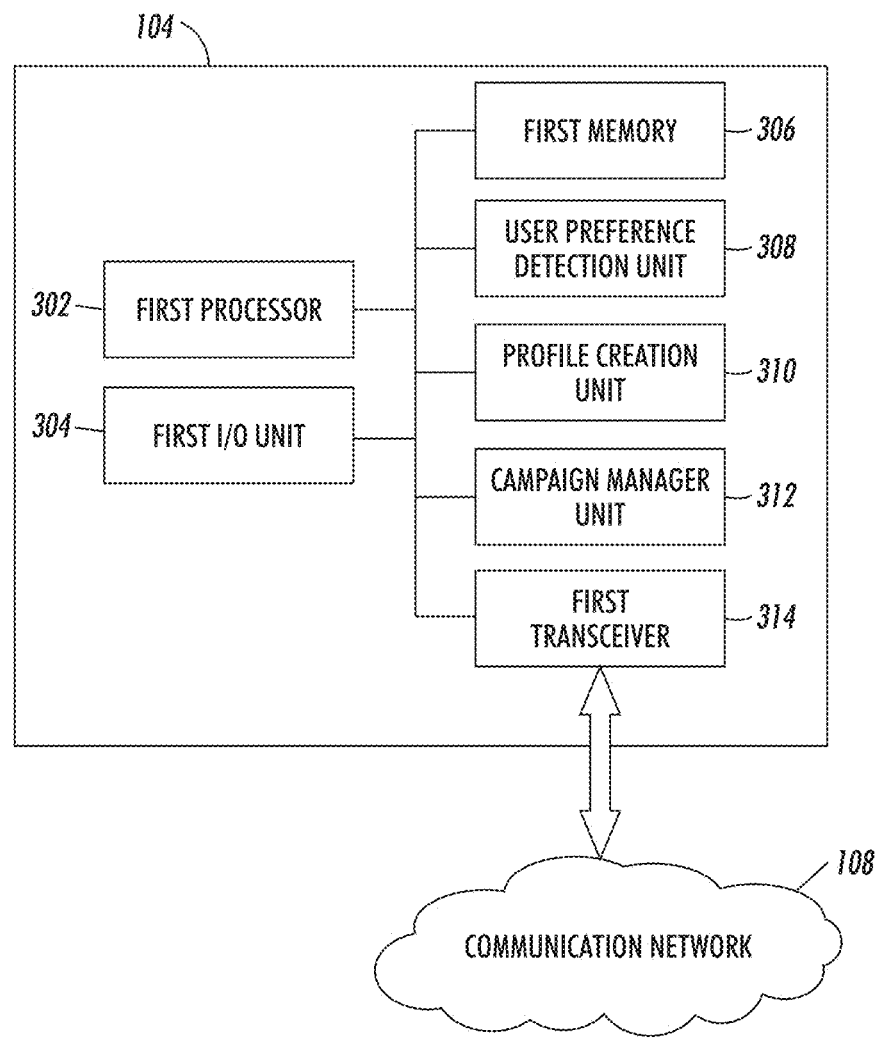
FIG. 3 is a block diagram that illustrates components of a mobile device, in accordance with at least one embodiment.

FIG. 3 is a block diagram that illustrates various components of the mobile device 104, in accordance with at least one embodiment. FIG. 3 is explained in conjunction with FIG. 1 and FIG. 2.

The mobile device 104 includes a first processor 302, a first input/output (I/O) unit 304, a first memory 306, a user preference detection unit 308, a profile creation unit 310, a campaign manager unit 312, and a first transceiver 314. A person with ordinary skills in the art will appreciate that the scope of the disclosure is not limited to the components as described herein.

The first processor 302 may comprise suitable logic, circuitry, interface, and/or code that may be configured to execute one or more sets of instructions stored in the first memory 306. The first processor 302 may be communicatively coupled to the first I/O unit 304, the first memory 306, the user preference detection unit 308, the profile creation unit 310, the campaign manager unit 312, and the first transceiver 314. The first processor 302 may execute the one or more sets of instructions, programs, codes, and/or scripts stored in the first memory 306 to perform the one or more predetermined operations. For example, the first processor 302 may work in coordination with the first I/O unit 304, the first memory 306, the user preference detection unit 308, the profile creation unit 310, the campaign manager unit 312, and the first transceiver 314, to receive the targeted content. The first processor 302 may be implemented based on a number of processor technologies known in the art. Examples of the first processor 302 include, but not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The first I/O unit 304 may comprise suitable logic, circuitry, interfaces, and/or code that may be configured to receive an input from the user (not shown). The first I/O unit 304 may be further configured to provide an output to the user. In an embodiment, the user may perform the predetermined action by providing an input using the first I/O unit 304. The predetermined action performed by the mobile device 104 may correspond to scanning of the MRC displayed on the digital signage board 102. In an embodiment, the first I/O unit 304 may be configured to display the notification (received after the predetermined action is performed on the mobile device 104) to the user on a display device associated with the mobile device 104. The first I/O unit 304 may be configured to receive an input as either acceptation or rejection of the notification received on the mobile device 104. The first I/O unit 304 may comprise various input and output devices such as a keyboard, a mouse, a joystick, a touch screen, a touch pad, a microphone, a camera, a motion sensor, and/or a light sensor. Further, the first I/O unit 304 may realized as a display screen (not shown). The display screen may be realized through several known technologies, such as, but are not limited to, Liquid Crystal Display (LCD) display, Light Emitting Diode (LED) display, and/or Organic LED (OLED) display technology.

The first memory 306 may comprise suitable logic, circuitry, and/or interfaces that may be configured to store one or more machine codes, and/or computer programs having at least one code section executable by the first processor 302. The first memory 306 may be further configured to store the one or more sets of instructions, codes, and/or scripts. In an embodiment, the first memory 306 may be configured to store one or more of the first metadata, the second metadata, the user profile, and the map data. Some of the commonly known memory implementations include, but are not limited to, a random access memory (RAM), a read only memory (ROM), a hard disk drive (HDD), and a secure digital (SD) card. In an embodiment, the first memory 306 may include the one or more MRCs, and/or computer programs that are executable by the first processor 302 to perform the one or more predetermined operations. It will be apparent to a person having ordinary skills in the art that the one or more sets of instructions, programs, codes, and/or scripts stored in the first memory 306 may enable the hardware of the mobile device 104 to perform the one or more predetermined operations.

The user preference detection unit 308 may comprise suitable logic, circuitry, interface, and/or code that may be configured to determine the one or more user preferences based on the first metadata and the second metadata. The user preference detection unit 308 may be configured to assign the weight to each of the one or more product categories associated with the one or more products in vicinity of the digital signage board and the product corresponding to the first content. The user preference detection unit 308 may be further configured to compare weight associated with each of the one or more product categories with the pre-defined threshold. Based on the comparison, a set of product categories from the one or more product categories may be selected. The set of product categories may correspond to the one or more user preferences. The process of determination of the set of user preferences has been described later in conjunction with FIG. 4. In an embodiment, the user preference detection unit 308 may be implemented as an Application-specific Integrated Circuit (ASIC) microchip designed for a special application, such as to determine one or more user preferences based on the first metadata and the second metadata.

The profile creation unit 310 may comprise suitable logic, circuitry, interface, and/or code that may be configured to create a user profile based on the one or more user preferences. In addition to the one or more user preferences, the user profile may comprise one or more information that corresponds to a health condition, a diet preference, a travel history, a relationship status, an age, gender information, or a job status of the user. The user profile may be stored in the mobile device 104. The profile creation unit 310 may be further configured to update the user profile based on the one or more user preferences. In an embodiment, the profile creation unit 310 may be implemented as an Application-specific Integrated Circuit (ASIC) microchip designed for a special application such as to create a user profile based on the one or more user preferences.

The campaign manager unit 312 may comprise suitable logic, circuitry, interface, and/or code that may be configured to select the set of first campaigns from the one or more first campaigns based on the user profile. In an embodiment, the campaign manager unit 312 may receive the one or more campaign rules from the application server 106. In an embodiment, the campaign manager unit 312 may be configured to apply the one or more campaign rules on the user profile to determine which campaign rule may be relevant to the user. Based on the application of the one or more campaign rules, the campaign manager unit 312 may identify the set of first campaigns. Further, the campaign manager unit 312 may identify the set of user preferences from the user profile that are related to the set of first campaigns. The campaign manager unit 312 may be implemented as an Application-specific Integrated Circuit (ASIC) microchip designed for a special application such as to identify the set of campaigns relevant to the user.

The first transceiver 314 may comprise suitable logic, circuitry, interface, and/or code that may be configured to communicate with the one or more devices, such as the digital signage board 102 and/or one or more servers, such as the application server 106 over the communication network 108. The first transceiver 314 may be configured to transmit or receive the one or more sets of instructions, queries, advertisements, notifications, and/or other information to/from various components of the system environment 100. The first transceiver 314 may implement one or more known technologies to support wired or wireless communication with the communication network 108. In an embodiment, the first transceiver 314 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The first transceiver 314 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The operation of the mobile device 104 has been described later in conjunction with FIG. 5.

Figure 4:
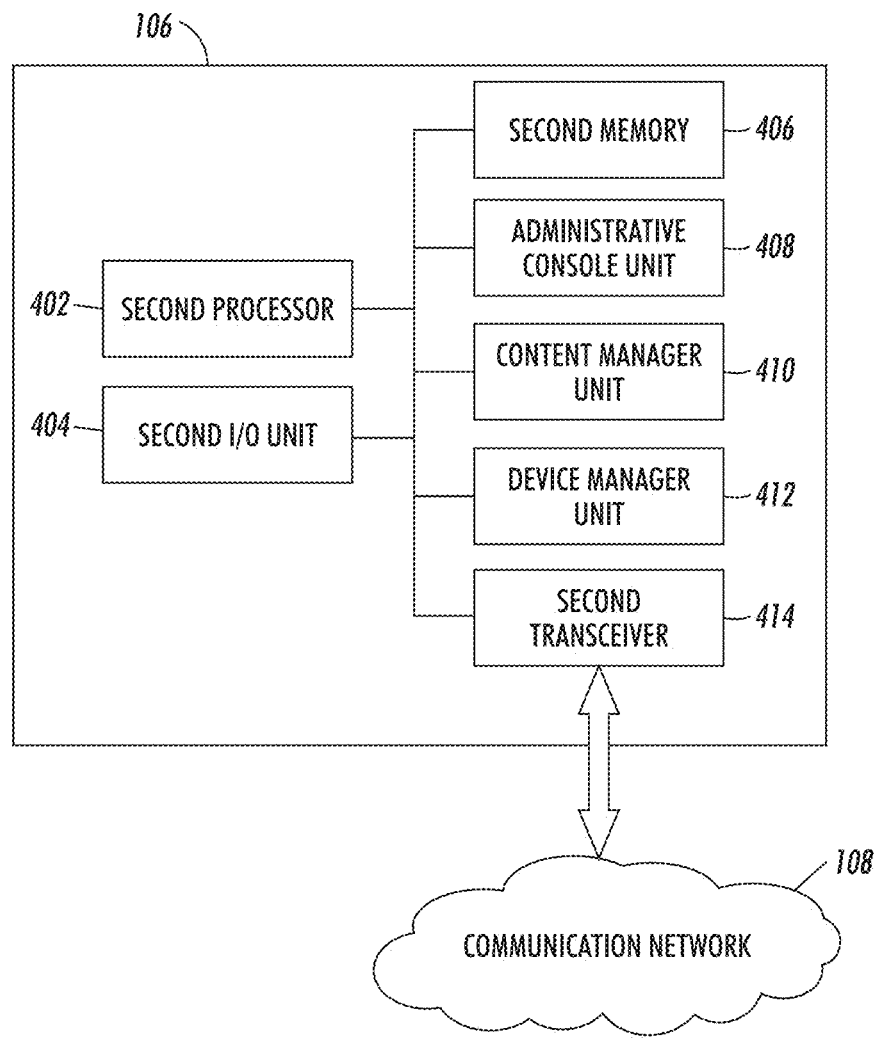
FIG. 4 is a block diagram that illustrates components of an application server, in accordance with at least one embodiment.

FIG. 4 is a block diagram that illustrates various components of the application server 106, in accordance with at least one embodiment. FIG. 4 is explained in conjunction with FIGS. 1-3.

The application server 106 includes a second processor 402, a second I/O unit 404, a second memory 406, an administrative console unit 408, a content manager unit 410, a device manager unit 412, and a second transceiver 414. A person with ordinary skills in the art will appreciate that the scope of the disclosure is not limited to the components as described herein.

The second processor 402 may comprise suitable logic, circuitry, interface, and/or code that may be configured to execute one or more sets of instructions stored in the second memory 406. The second processor 402 may be coupled to the second I/O unit 404, the second memory 406, the administrative console unit 408, the content manager unit 410, the device manager unit 412, and the second transceiver 414. The second processor 402 may execute the one or more sets of instructions, programs, codes, and/or scripts stored in the second memory 406 to perform the one or more predetermined operations. The second processor 402 may be implemented based on a number of processor technologies known in the art. Examples of the second processor 402 include, but not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The second I/O unit 404 may comprise suitable logic, circuitry, interfaces, and/or code that may be configured to receive an input from an administrator (not shown). The second I/O unit 404 may be further configured to provide an output to the administrator. In an embodiment, the input may correspond to creation of the one or more first campaigns and the one or more second campaigns. In an embodiment, the input may further correspond to create the one or more campaign rules for the one or more first campaigns and the one or more second campaigns. The second I/O unit 404 may comprise various input and output devices such as a keyboard, a mouse, a joystick, a touch screen, a touch pad, a microphone, a camera, a motion sensor, and/or a light sensor. Further, the second I/O unit 404 may realized as a display screen (not shown). The display screen may be realized through several known technologies, such as, but are not limited to, Liquid Crystal Display (LCD) display, Light Emitting Diode (LED) display, and/or Organic LED (OLED) display technology.

The second memory 406 may comprise suitable logic, circuitry, and/or interfaces that may be configured to store one or more contents, and/or computer programs having at least one code section executable by the second processor 402. The second memory 406 may be further configured to store the one or more sets of instructions, codes, and/or scripts. In an embodiment, the second memory 406 may be configured to store the one or more first campaigns and the one or more second campaigns. Some of the commonly known memory implementations include, but are not limited to, a random access memory (RAM), a read only memory (ROM), a hard disk drive (HDD), and a secure digital (SD) card. It will be apparent to a person having ordinary skill in the art that the one or more sets of instructions, programs, codes, and/or scripts stored in the second memory 406 may enable the hardware of the application server 106 to perform the one or more predetermined operations.

The administrative console unit 408 may comprise suitable logic, circuitry, and/or interfaces that may be utilized by an administrator of the store to create the one or more first campaigns and the one or more second campaigns for the mobile device 104 and the digital signage board 102, respectively. The administrator may further utilize the administrative console unit 408 to create a schedule for the one or more first campaigns and the one or more second campaigns. In an embodiment, the administrator console unit may enable the administrator to define the one or more campaign rules for each of the one or more first campaigns and the one or more second campaigns. In an embodiment, the administrative console unit 408 may be as an ASIC microchip designed for a special application, such as to display a user interface to the administrator that enables the administrator to provide the input.

The content manager unit 410 may comprise suitable logic, circuitry, and/or interfaces that may be configured to maintain a repository of the targeted content. The content manager unit 410 may receive the set of user preferences from the mobile device 104. Based on the set of user preferences, the content manager unit 410 may select the targeted content to be transmitted to the user of the mobile device 104. In an embodiment, the content manager unit 410 may be implemented as an ASIC microchip designed for a special application, such as to select the content that may be relevant to the user, based on the set of user preferences.

The device manager unit 412 may comprise suitable logic, circuitry, and/or interfaces that may be configured to manage scheduling of the one or more first campaigns and the one or more second campaigns on the mobile device 104 and the digital signage board 102, respectively. In an embodiment, the device manager unit 412 may manage the scheduling of the one or more first campaigns and the one or more second campaigns as per the schedule defined by the administrator. In an embodiment, the device manager unit 412 may be configured to transmit the one or more campaign rules pertaining to the one or more first campaigns to the mobile device 104, through the second transceiver 414. In an embodiment, the device manager unit 412 may further transmit the first content (defined in the one or more second campaigns) to the digital signage board 102, through the second transceiver 414. The device manager unit 412 may be implemented as an ASIC microchip designed for a special application, such as to add/remove one or more devices within the store.

The second transceiver 414 may comprise suitable logic, circuitry, interface, and/or code that may be configured to communicate with the one or more devices such as the digital signage board 102 and/or one or more mobile devices, such as the mobile device 104 over the communication network 108. The second transceiver 414 may be configured to transmit or receive the one or more sets of instructions, queries, advertisements, notifications, and/or other information to/from various components of the system environment 100. The second transceiver 414 may implement one or more known technologies to support wired or wireless communication with the communication network 108. In an embodiment, the second transceiver 414 may include, but is not limited to, an antenna, a radio frequency (RF) transceiver, one or more amplifiers, a tuner, one or more oscillators, a digital signal processor, a USB device, a CODEC chipset, a SIM card, and/or a local buffer. The second transceiver 414 may communicate via wireless communication with networks, such as the Internet, an Intranet and/or a wireless network, including a cellular telephone network, a wireless LAN and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 5A:
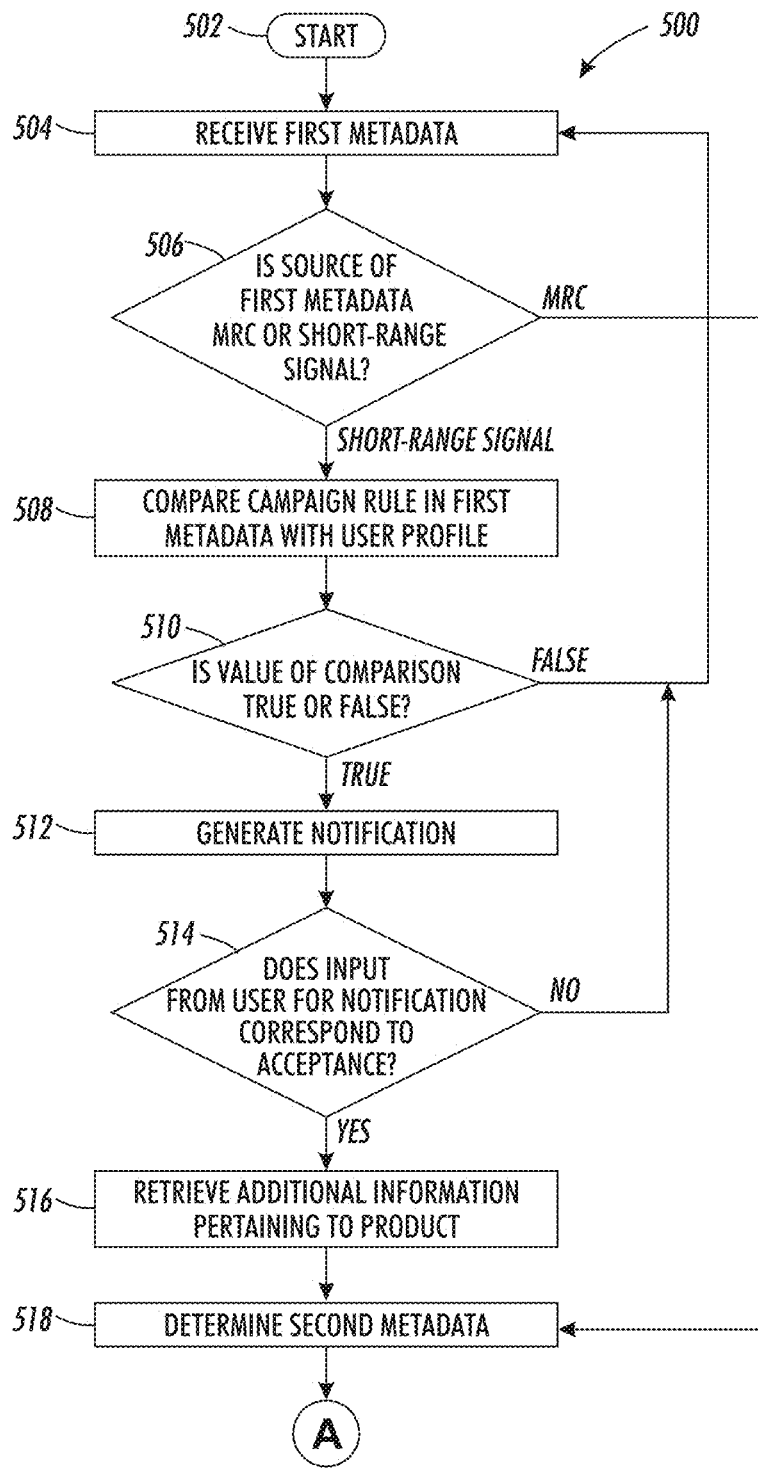
FIGS. 5A and 5B is a flowchart that collectively illustrates a method for receiving targeted content, in accordance with at least one embodiment.
Figure 5B:
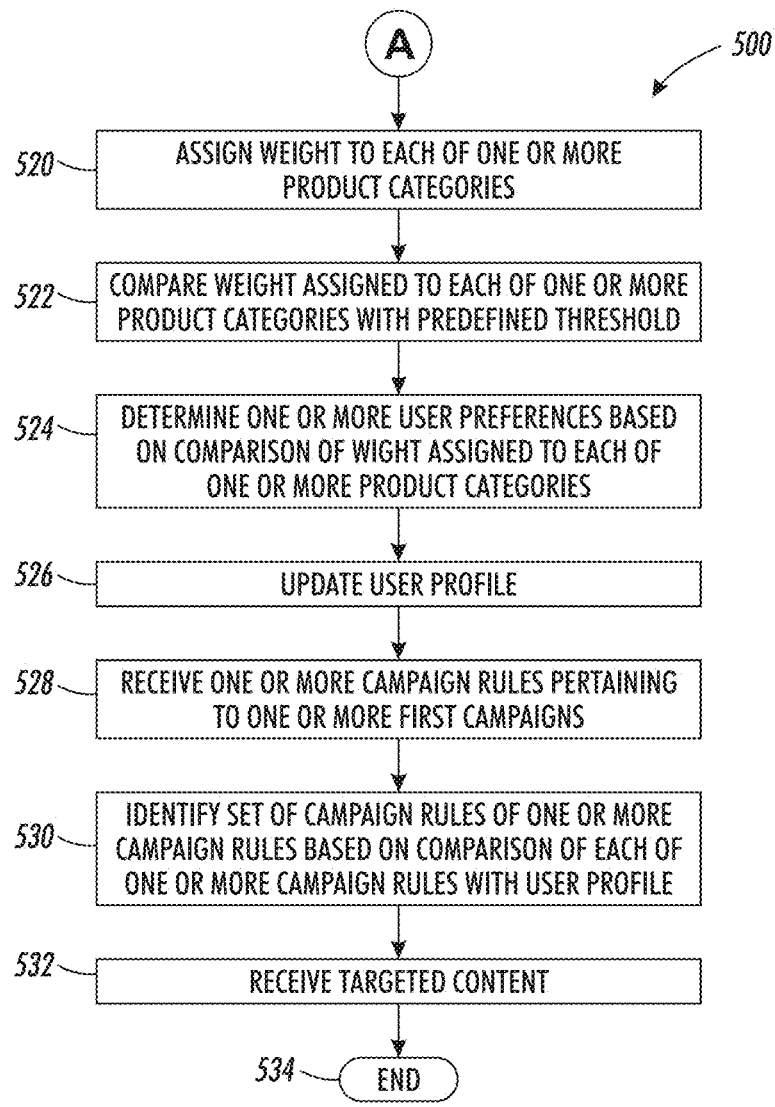

FIGS. 5A and 5B is a flowchart 500 that collectively illustrates a method for receiving the targeted content on the mobile device 104, in at least one embodiment. The flowchart 500 maybe described in conjunction with FIGS. 1-4. The method starts at step 502 and proceed to step 504.

At step 504, the first metadata is received. In an embodiment, the first processor 302 may be configured to receive the first metadata through the first transceiver 314. Before receiving the first metadata, the user of the mobile device 104 may come in vicinity of the digital signage board 102. In an embodiment, the user of the mobile device 104 may scan the MRC being displayed on the digital signage board 102, along with the first content. In such a scenario, the user may be interested in the product for which the first content is being displayed. The first processor 302 may be configured to extract the first metadata from the scanned MRC.

For example, the digital signage board 102 displays the first content related to the television. The user of the mobile device 104 may be interested in television; hence, scans the MRC being displayed along with the first content.

In another scenario, the user browsing through a section of a store that may be of interest to the user. For example, the user is browsing through the electronic section of the store and has somehow missed the first content being displayed on the digital signage board 102. In such a scenario, the first processor 302 of the mobile device 104 may receive the first metadata from the digital signage board 102 installed in the section of the store over the short-range signal. In an embodiment, the first processor 302 may receive the first metadata in accordance with the one or more of a short-range communication protocols, such as a NFC, a Bluetooth, a Wi-Fi network, or a Bluetooth Low Energy (BLE).

In an embodiment, the first metadata comprises a location of the digital signage board, a product ID, a product name, a product category of the product, a time stamp associated with the first content displayed on the digital signage board, an external URL associated with the product name, and/or a campaign rule associated with the first content. For example, the first metadata comprises the location of the digital signage board 102, such as a electronic section of the store, the product ID, such as T-DP10W12, the product name, such as star lamp A10, the product category, such as ecofriendly lamp, the time stamp associated with the first content displayed on the digital signage board 102, such as 11:45 am, the external URL associated with the product name, such as "http://www.starlamp.com", and the campaign rule associated with the advertisement, such as "Boolean(//interest//environment friendly)".

A person skilled in the art will understand that the scope of the disclosure should not be limited to the representation of the first metadata. Further, the examples provided in supra are for illustrative purposes and should not be construed to limit the scope of the disclosure. In another embodiment, the first metadata may be in the form of an array, a table, or a linked list, and the like.

After receiving the first metadata, at step 506, a check is performed to determine the source of the first metadata. In an embodiment, the first processor 302 may be configured to perform the check. In an embodiment, if at step 506, it is determined that the first metadata is extracted from the MRC, step 518 is performed. If at the step 506, it is determined that the first metadata is received over the short-range signal, the step 508 is performed.

At step 508, the campaign rule in the first metadata may be compared with the user profile. In an embodiment, the campaign manager unit 312 in conjunction with the first processor 302 may compare the campaign rule with the user profile. For example, the campaign rule is "//interest//environment friendly". Further, the user profile comprises "environment friendly" in the product preference portion of the user profile, the campaign manager unit 312 may return a value "true" for the campaign rule. In an embodiment, the value "true" signifies that the user may be interested in the product that is being displayed on the digital signage board 102. If the campaign manager unit 312 returns the value "false" for the campaign rule, the value "false" signifies that the user may not be interested in the product that is being displayed on the digital signage board 102.

At step 510, a check is performed to determine whether the value of the comparison between the user profile and the campaign rule is true. In an embodiment, the first processor 302 may perform the check. In an embodiment, if at step 510, it is determined that the value of the comparison is "true", step 512 is performed. If at step 510 it is determined that the value of the comparison is "false", the step 504 is repeated.

At step 512, a notification is generated. In an embodiment, the first processor 302 may generate the notification. In an embodiment, the first processor 302 may display the notification to the user on the mobile device 104. In an embodiment, the notification may ask the user whether the user is interested to get more information on the product for which the first content is being displayed to the user. In an embodiment, the first processor 302 may receive an input from the user in response to the notification.

At step 514, a check is performed to determine whether the input from the user for the notification correspond to an acceptance. In an embodiment, the first processor 302 may perform the check. In an embodiment, if the first processor 302 determines that the user has provided the input corresponding to the acceptance, the step 516 may be performed, else the step 504 is repeated. At step 516, additional information pertaining to the product is retrieved from the application server 106. In an alternate embodiment, the additional information may be retrieved from the external URL (in the first metadata). In an embodiment, the first processor 302 may retrieve additional information pertaining to the product from the application server 106.

In an embodiment, during the creation of the one or more second campaigns the administrator of the application server 106 may have provided additional information pertaining to the product (for which the first content is displayed on the digital signage board 102). In an embodiment, the additional information is not displayed on the digital signage board 102. In an embodiment, the additional information may be transmitted to the mobile device 104 only on an ad-hoc basis. In an embodiment, the additional information may comprise, but are not limited to, discount information, advertisement, warranty information, and the like. The first processor 302 may transmit a query to retrieve this additional information, when an input pertaining to the acceptance is received from the user.

At step 518, the second metadata is determined. In an embodiment, the first processor 302 may be configured to determine the second metadata. In an embodiment, the second metadata comprises one or more product categories associated with one or more products in vicinity of the digital signage board 102. To determine the second metadata, the first processor 302 may determine the location of the digital signage board 102. In an embodiment, the first processor 302 may determine the location of the digital signage board 102 from the first metadata associated with the first content. In an embodiment, the location of the digital signage board 102 may correspond to a coordinate location of the digital signage board 102 in the store. In an embodiment, the first processor 302 may utilize the map data of the store to determine a section of the store, where the digital signage board 102 is installed. In an embodiment, the first processor 302 may be configured to obtain information pertaining to the one or more products on display in the determined section from the application server 106. In an embodiment, the first processor 302 may transmit a query to retrieve the information pertaining to the one or more products on display in the determined section. In an alternate embodiment, the map data in the mobile device 104 may comprise the information pertaining to the one or more products on display in vicinity of the digital signage board 102 (i.e., in the determined section). After obtaining the information pertaining to the one or more products in vicinity of the digital signage board 102, the first processor 302 may determine the one or more product categories associated with each of the one or more products. In an embodiment, the first processor 302 may utilize a product ontology to determine the one or more categories associated with the one or more products in vicinity of the digital signage board 102. In addition, the first processor 302 may further determine the one or more product categories associated with the product for which the first content is displayed on the digital signage board 102.

A person having ordinary skills in the art would understand that the product ontology may be stored in the mobile device 104 for determining the one or more product categories. In an embodiment, the product ontology may be stored using one or more known technologies such as OWL (web ontology language).

At step 520, a weight may be assigned to each of the one or more product categories. In an embodiment, the user preference detection unit 308 in conjunction with the first processor 302 may be configured to assign the weight to each of the one or more product categories. To assign the weight to each of the one or more product categories, the first processor 302 may determine a parent category for each of the one or more product categories. A person having ordinary skills in the art will appreciate that each of the one or more product categories may be organized or stored in a multi-level category tree in which a first product category may be a parent category of a second product category. Further, the first product category may a child of a third product category. Therefore, each of the one or more product categories may be derived from the parent product category. For example, the parent category of the product category "lighting" may be "electronics". In another example, the parent category of the product category "ink-jet printer" can be "printer".

A person having ordinary skills in the art would appreciate that such multi-level category tree maintained for each of the one or more product categories may correspond to the product ontology (i.e., utilized to determine the one or more product categories of the one or more products in vicinity of the digital signage board 102).

To assign weight to each of the one or more product categories, the user preference detection unit 308 may assign weight "1" to each of the one or more product categories. Thereafter, for each of the one or more product categories, the user preference detection unit 308 may determine the parent category. Further, the user preference detection unit 308 may determine a level of the parent category in the multi-level category tree. For example, the first product category, which parent product category of the second product category, is at level 2 in the multi-level category tree. Further, the third product category, which parent product category of the first product category, is at level 3 in the multi-level category tree.

After determining the level of the parent product category, the user preference detection unit 308 may assign the weight to the parent product category of each of the one or more product categories. In an embodiment, the user preference detection unit 308 may utilize the following equation to assign the weight to the parent product category:

$$\text{weight}\{pt\} \leftarrow \text{weight}\{pt\} + 1/(10^{level}) \quad (1)$$

where, weight{pt}: Weight assigned to the parent product category pt; and

Level: Level corresponds to the level of the parent product category in the multi-level category tree.

Therefore, from equation 1, it may be observed that the user preference detection unit 308 assigns a weight, having value $\frac{1}{10}^{th}$ of the level associated with the parent product category, to the parent product category.

After assigning weight to each of the one or more product categories at step 522, the mobile device 104 may be configured to compare the weights assigned to each of the one or more product categories with the pre-defined threshold.

At step 524, the one or more user preferences are determined based on the comparison of weights assigned to each of the one or more product categories with the pre-defined threshold. In an embodiment, the user preference detection unit 308 may be configured to determine the one or more user preferences. In an embodiment, the user preference detection unit 308 may select a set of product categories from the one or more product categories based on the comparison. In an embodiment, the user preference detection unit 308 may select the set of product categories such that the weights assigned to each product category in the set of product categories exceeds the pre-defined threshold. In an embodiment, the set of product categories corresponds to the one or more user preferences.

At step 526, the user profile of the user of the mobile device 104 may be updated. In an embodiment, the profile creation unit 310 may be configured to update the user profile of the user. In an embodiment, the profile creation unit 310 may receive the one or more user preferences from the user preference detection unit 308. In an embodiment, based on the one or more user preferences, the profile creation unit 310 may update the user profile. In an embodiment, the user profile of the user is stored in accordance with the OWL standard. The user profile has been described later in conjunction with FIG. 7. In an embodiment, the profile creation unit 310 may update the user profile to include the determined one or more user preferences. In an embodiment, the one or more user preferences may be added to the user profile as per the OWL standard.

In an embodiment, in addition to the one or more user preferences, the user profile may further comprise information pertaining to a health condition, a diet preference, a travel history, a relationship status, an age, gender information, and a job status.

At step 528, the one or more campaign rules pertaining to the one or more first campaigns may be received from the application server 106. In an embodiment, the campaign manager unit 312 in conjunction with the first processor 302 may be configured to receive the one or more campaign rules. In an embodiment, the one or more campaign rules correspond to Boolean Xpath rules, which when compared against the user profile, returns at least one of the true values or a false value.

At step 530, a set of campaign rules of the one or more campaign rules are identified based on a comparison of each of the one or more campaign rules with the user profile. In an embodiment, the campaign manager unit 312 may be configured to identify the set of campaign rules. In an embodiment, the campaign manager unit 312 may compare each of the one or more campaign rules with the user profile to determine whether each of the one or more campaign rules are relevant to the user. For example, the user profile comprises user preference "Eco-Friendly", "Walkman" and "Television". The campaign manager unit 312 receives a campaign rule "//interest/lighting". The campaign manager unit 312 compares the campaign rule with the user profile to determine that the campaign rule is not relevant to the user profile, as the user profile does include the user preference "lighting". In another example, the campaign manager unit 312 receives a campaign rule "//interest/Eco-friendly". The campaign manager unit 312 may mark this campaign rule as relevant, as the user is interested in eco-friendly devices (as per the user profile).

Similarly, the campaign manager unit 312 may identify the set of campaign rules that are relevant to the user based on the comparison of each of the one or more campaign rules with the user profile. In an embodiment, the campaign manager unit 312 may further be configured to identify a set of user preferences from the user profile based on the identified set of campaign rules. In an embodiment, the campaign manager unit 312 may identify the set of user preferences from the Xpath definition of the set of campaign rules. For example, the campaign rule "//interest/Eco-friendly" is relevant, the campaign manager unit 312 may identify "eco-friendly" as the set of user preferences.

At step 532, the targeted content is received from the application server 106. In an embodiment, the campaign manager unit 312 may be configured to receive the targeted content. The targeted content may correspond to an advertisement, a coupon, a promotion, and an offer on a product that may be of interest to the user. To receive the targeted content, the campaign manager unit 312 may transmit the set of user preferences to the application server 106 in accordance with an oblivious transfer (OT) protocol. Control passes to end step 534.

In an embodiment, the OT protocol may correspond to a cryptographic protocol for private information retrieval. In an embodiment, the campaign manager unit 312 may generate a query to extract $i^{th}$ targeted content item from the "n" target content items in the application server 106. Based on the OT protocol, the mobile device 104 may transfer a query "Q (i)" along with a private key to the application server 106. The query Q (i) may comprise a vector of the set of user preferences. After receiving the query Q (i), the application server 106 may compute a cipher text "c" based on "n" content items and transmit the computed "c" to the mobile device 104. The mobile device 104 may be configured to perform a cryptographic operation over "c" using the private key to extract the "$i^{th}$" targeted content item from "c". In an embodiment, the targeted content item corresponds to the targeted content. In an embodiment, the first processor 302 may display the targeted content on the display of the mobile device 104.

As the application server 106 is unaware of the content item that the mobile device 104 has extracted from "c", therefore, the application server 106 cannot possibly determine the set of user preferences. Hence, the privacy of the user is preserved.

A person having ordinary skills in the art will appreciate that the scope of the disclosure is not limited to receive the targeted content from the application server 106 using the OT protocol. In an embodiment, any other protocol that preserves user privacy may be used to receive the targeted content from the application server 106.

Figure 6:
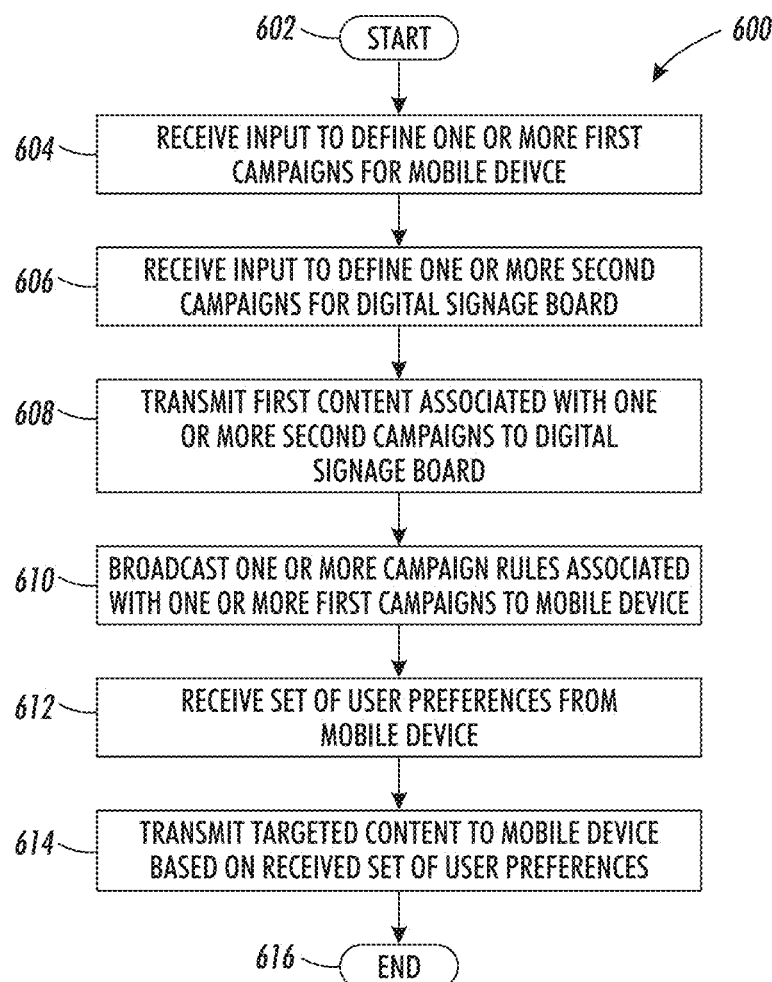
FIG. 6 is a flowchart that illustrates a method for transmitting a targeted content from an application server to a mobile device, in accordance with at least one embodiment.

FIG. 6 is a flowchart 600 that illustrates a method for transmitting the targeted content from the application server 106 to the mobile device 104, in accordance with at least one embodiment. The flowchart 600 may be described in conjunction with FIGS. 1-5. The method starts at step 602 and proceeds to step 604.

At step 604, an input to define the one or more first campaigns for the mobile device 104 may be received from the administrator. In an embodiment, the administrative console unit 408 may be configured to display a user interface that enables the administrator of the application server 106 to provide the input. The one or more first campaigns may include the one or more campaign rules, the targeted contents and the schedule of the one or more first campaigns. As discussed, the one or more campaign rules may be utilized by the mobile device 104 to determine whether the respective first campaign is relevant to the user. In an embodiment, the schedule defined by the administrator may indicate duration for which the first campaign is valid.

At step 606, an input to define the one or more second campaigns for the digital signage board 102 may be received from the administrator. The one or more second campaigns may include the one or more campaign rules, the first content, and the schedule of the one or more second campaigns. In an embodiment, the one or more second campaigns may further include the information pertaining to the digital signage board 102 for which the one or more second campaigns have been defined. A person having ordinary skills in the art will appreciate that the store may comprise more than one digital signage boards. In an embodiment, the administrator may define a second campaign for the each digital signage board 102 installed in the store. In an embodiment, the administrator may use the user interface to define the one or more first campaigns and the one or more second campaigns.

Example of user interfaces has been described later in conjunction with FIGS. 9A, 9B, 9C, and 9D.

At step 608, the first content, associated with the one or more second campaigns, may be transmitted to the digital signage board 102. In an embodiment, the device manager unit 412 may be configured to transmit the first content to the digital signage board 102.

At step 610, the one or more campaign rules associated with the one or more first campaigns to the mobile device 104 may be broadcasted to the mobile device 104. In an embodiment, the device manager unit 412 may be configured to broadcast the one or more campaign rules.

At step 612, the set of user preferences may be received from the mobile device 104 using oblivious transfer protocol. In an embodiment, the content manager unit 410 may receive the set of user preferences.

At step 614, the targeted content may be transmitted to the mobile device 104 based on the received set of user preferences. In an embodiment, the content manager unit 410 may be configured to transmit the targeted content. Control passes to end step 616.

Figure 7:
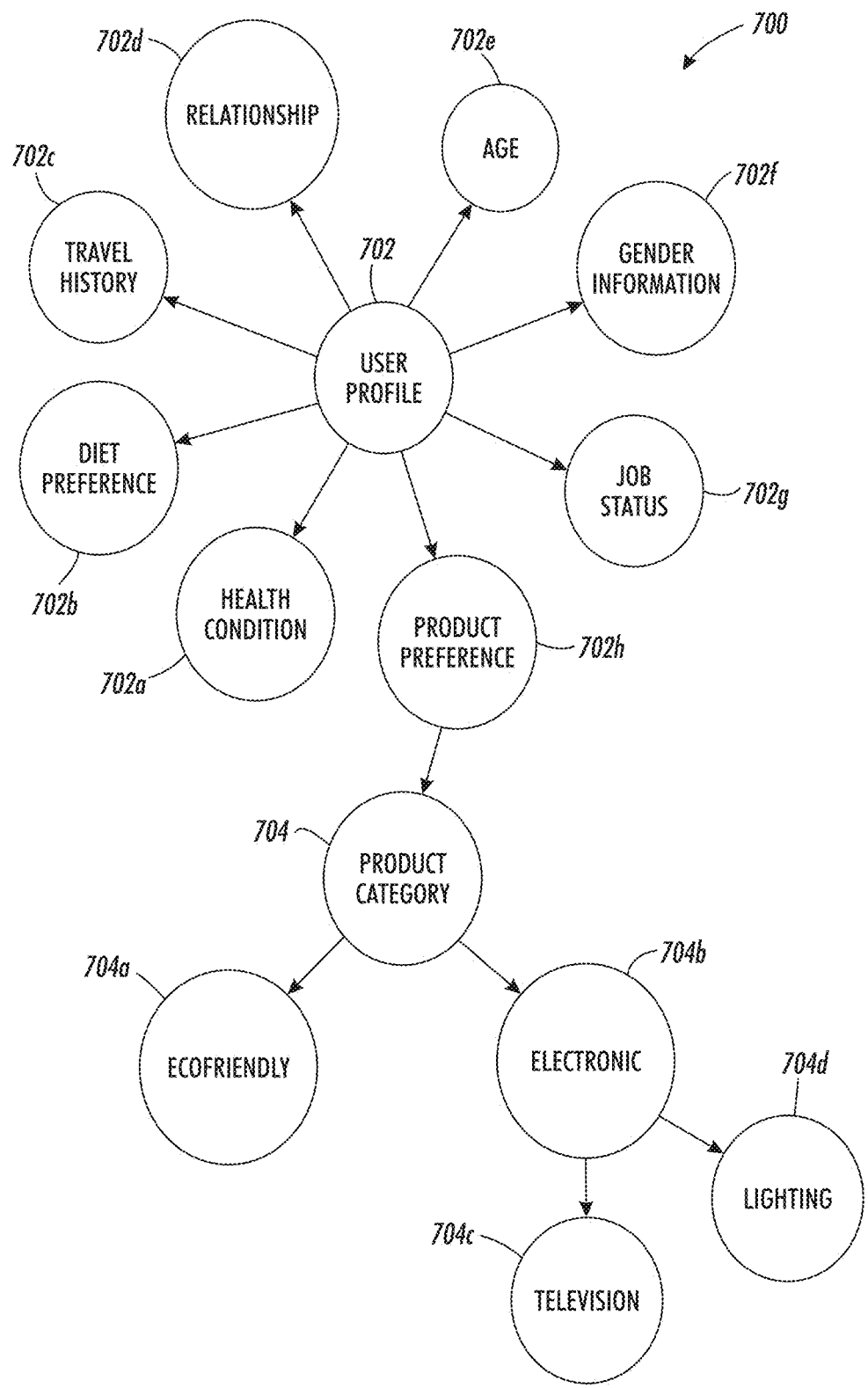
FIG. 7 is a block diagram that illustrates a structure of an ontology, in accordance with at least one embodiment.

FIG. 7 is a block diagram that illustrates a structure of the ontology, in accordance with at least one embodiment. FIG. 7 is explained in conjunction with FIGS. 1-6. The block diagram 700 represents the structure of the ontology that comprises a user profile node 702 and a product category node 704. Further, the structure of the ontology maintains a relationship between the user profile node 702 and the product category node 704. In an embodiment, the user profile may be stored in the ontology in accordance with the OWL standard.

The user profile node 702 may be associated with a plurality of nodes that represents an information associated with the user. The information associated with the user may correspond to a health condition (denoted by 702a), a diet preference (denoted by 702b), a travel history (denoted by 702c), a relationship status (denoted by 702d), an age (denoted by 702e), a gender information (denoted by 702f), a job status (denoted by 702g), and a product preference (702h). The product category node 704 may be associated with one or more product sub-category nodes that represent one or more product sub-categories. For example, the one or more product sub-categories may correspond to an eco-friendly product (denoted by 704a), and/or an electronic product (denoted by 704b). The product sub-category (electronic product) may further be classified into lighting product (denoted by 704d) and television product (denoted by 704c). Further, one or more product category nodes may be added with the product category node 704 in the structure of the ontology, based on the one or more preferences of the user. Similarly, one or more nodes may be added with the user profile node 702 based on the updated information associated with the user.

Figure 8:
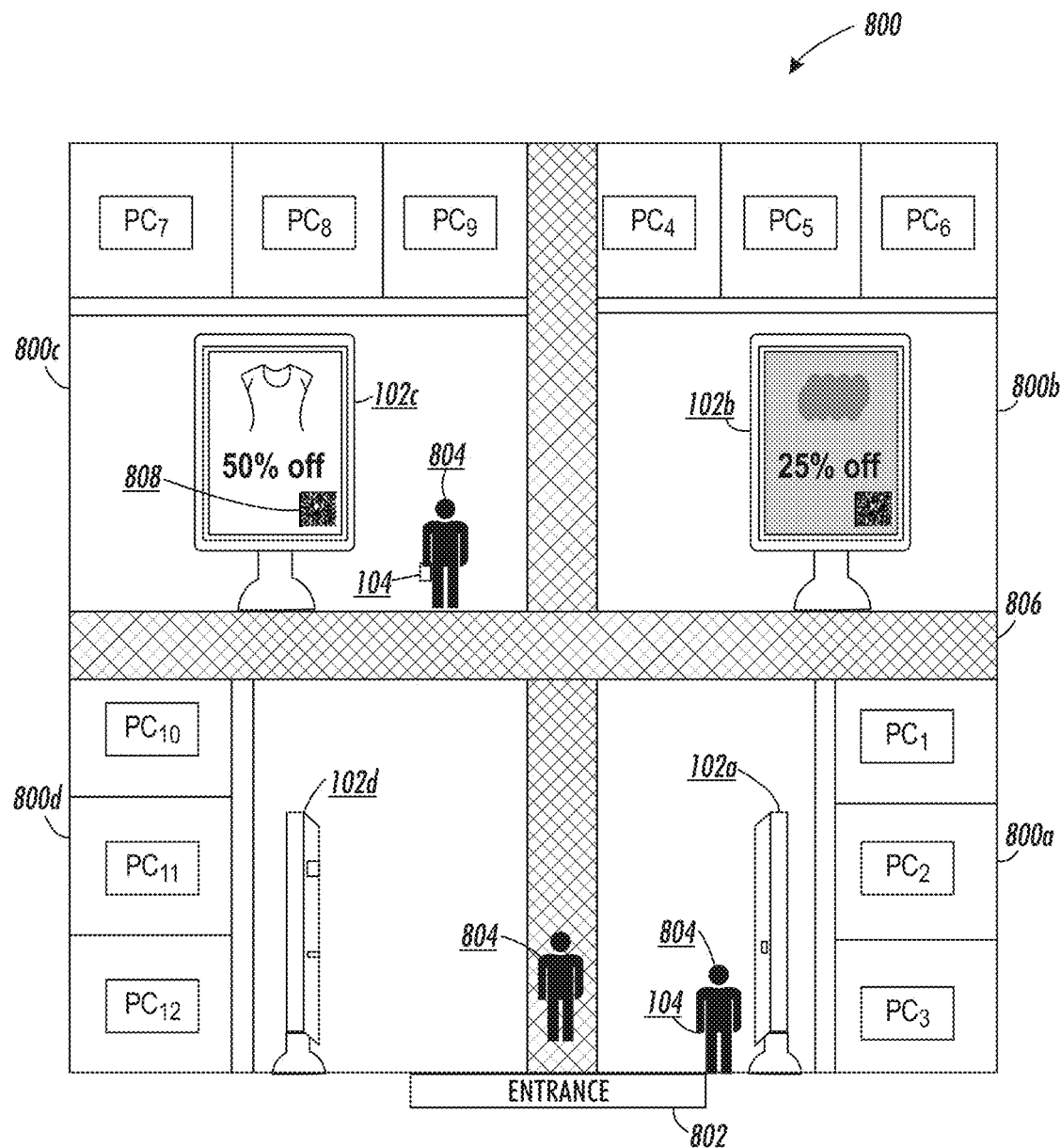
FIG. 8 is a block diagram that illustrates an exemplary scenario for receiving targeted content, in accordance with at least one embodiment.

FIG. 8 is a block diagram 800 that illustrates an exemplary scenario for receiving targeted content on the mobile device 104, in accordance with at least one embodiment. FIG. 8 is explained in conjunction with FIGS. 1-7. The block diagram 800 represents a store that includes a first section 800a, a second section 800b, a third section 800c, and a fourth section 800d. The first section 800a correspond to an electronic section, the second section 800b may correspond to a grocery section, the third section 800c may correspond to an apparel section, and the fourth section 800d may correspond to the footwear section.

The first section 800a may include one or more electronic products of one or more electronic product categories ($PC_1$, $PC_2$, and $PC_3$), and a first digital signage board 102a. The second section 800b may include one or more grocery products of one or more grocery product categories ($PC_4$, $PC_5$, and $PC_6$), and a second digital signage board 102b. The third section 800c may include one or more apparel products of one or more apparel product categories ($PC_7$, $PC_8$, and $PC_9$), and a third digital signage board 102c. The fourth section 800d may include one or more footwear products of one or more footwear product categories ($PC_{10}$, $PC_{11}$, and $PC_{12}$), and a fourth digital signage board 102d. Further, the store may include an entrance gate 802, a user 804, and a walking path 806.

In an exemplary scenario, the user 804 may enter the store 800 through the walking path 806 to purchase one or more electronic products. The user 804 may enter via the entrance gate 802 in the store 800 and arrive in the first section 800a. The first section 800a may include one or more electronic products ($P_1$, $P_2$, and $P_3$) related to the one or more electronic product categories ($PC_1$, $PC_2$, and $PC_3$), such as "eco-friendly lamp", "television", and "laptop". The first digital signage board 102a may display an advertisement related to the one electronic product ($P_1$) of the electronic product category ($PC_1$). The first digital signage board 102a may use BLE communication channel to broadcast the first metadata corresponding the advertisement. The user 804 may carry a mobile device 104. For example, when user 804 is within a vicinity of the first digital signage board 102a, the mobile device 104 may receive the first metadata corresponding to the advertisement displayed on the first digital signage board 102a. The first metadata may comprise the location of the first digital signage board 102a, the product ID of the electronic product ($P_1$), the electronic product ($P_1$) name, the electronic product category ($PC_1$), a time stamp associated with the advertisement displayed on the first digital signage board 102a, an external URL associated with the electronic product name, and/or a campaign rule associated with the advertisement.

In an embodiment, the location of the first digital signage board 102a may be "the first section 800a", the electronic product ID may be "T-DP10W12", the electronic product name may be "star lamp A10", the electronic product category may be "eco-friendly lamp", the time stamp associated with the advertisement displayed on the first digital signage board 102a may be "11:45 am", the external URL associated with the electronic product name may be "http://www.starlamp.com", and/or the campaign rule associated with the advertisement may be "Boolean (//interest//environment friendly)".

In an embodiment, the campaign rule associated with the advertisement may be compared with the user profile. For example, the campaign rule is "//interest//environment friendly" may be compared with the user profile. Further, the user profile comprises "environment friendly" in the product preference (702h) of the user profile (shown in FIG. 7). In an embodiment, the value of comparison is "true", that signifies that the user may be interested in the electronic product ($P_1$) that is being displayed on the digital signage board 102a.

In an embodiment, a notification may be received on the mobile device 104 based on the comparison. The notification may ask the user whether the user is interested to get more information on the electronic product ($P_1$) displayed on the digital signage board 102a. Further, the notification may include an option to provide user input to accept or reject the notification. The user 804 may provide the user input by accepting the notification. Based on the acceptance, the mobile device 104 may retrieve additional information of the electronic product ($P_1$) such as eco-friendly product. In an embodiment, the additional information may not be displayed on the digital signage board 102. In an embodiment, the additional information may be transmitted to the mobile device 104 only on an ad-hoc basis. In an embodiment, the additional information may comprise, but are not limited to, discount information, advertisement, warranty information, and the like.

In another exemplary scenario, the user 804 may walk through the third section 800c, via the walking path 806. The third section 800c may include one or more apparel products ($P_7$, $P_8$, $P_9$) related to the one or more apparel product categories ($PC_7$, $PC_8$, $PC_9$), such as "ethnic wear", "casual wear", and "bridal wear". The third digital signage board 102c may display an advertisement related to one apparel products ($P_7$) of the apparel product category ($PC_7$), with 50% discount.

The third digital signage board 102c may use the BLE communication channel to broadcast the first metadata corresponding to the advertisement of an apparel on the mobile device 104. For example, when user 804 is within vicinity of the third digital signage board 102c, the mobile device 104 may receive the first metadata corresponding to the advertisement displayed on the third digital signage board 102c. The first metadata may comprise the location of the third digital signage board 102c, the product ID of the apparel product ($P_7$), the apparel product ($P_7$) name, the apparel product category ($PC_7$), a time stamp associated with the advertisement displayed on the third digital signage board 102c, an external URL associated with the apparel product name, and/or a campaign rule associated with the advertisement.

In an embodiment, the location of the third digital signage board 102c may be "the third section 800c", the apparel product ID may be "D-ST10W12", the apparel product name may be "AL-A10", the apparel product category may be "ethnic wear", the time stamp associated with the advertisement displayed on the third digital signage board 102c may be "1:45 pm", the external URL associated with the apparel product name may be "http://www.ethnicwear.com", and/or the campaign rule associated with the advertisement may be "Boolean (//interest//ethnic wear)".

In an embodiment, the campaign rule associated with the advertisement may be compared with the user profile. For example, the campaign rule is "//interest//ethnic wear" may be compared with the user profile. Further, the user profile may not comprise "ethnic wear" in the product preference (702h) of the user profile (shown in FIG. 7). In an embodiment, the value of comparison is "false", that signifies that the user may not be interested in the apparel product ($P_7$) that is being displayed on the digital signage board 102c. In an embodiment, a notification may not be received on the mobile device 104 based on the comparison.

Further, the advertisement displayed on the third digital signage board 102c for the apparel product ($P_7$) with the discount of 50%, seems attractive to the user 804. The user 804 may scan a MRC displayed on the third digital signage board 102c, using mobile device 104. The MRC may correspond to a QR code 808. The QR code 808 may contain the first metadata corresponding to the advertisement displayed on the third digital signage board 102c. The mobile device 104 may receive the first metadata contained in the QR code 808.

The first metadata may comprise the location of the third digital signage board 102c, the product ID of the apparel product ($P_7$), the apparel product ($P_7$) name, the apparel product category ($PC_7$), a time stamp associated with the advertisement displayed on the third digital signage board 102c, an external URL associated with the apparel product name, and/or a campaign rule associated with the advertisement.

In an embodiment, the mobile device 104 may determine the second metadata that correspond to the one or more apparel product categories ($PC_7$, $PC_8$, and $PC_9$) associated with the one or more apparel products ($P_7$, $P_8$, and $P_9$) in vicinity of the third digital signage board 102c, based on the location of the third digital signage board 102c, such as "the third section 800c". In an embodiment, the mobile device 104 may receive the map data of the store 800 from the application server 106. The map data may comprise an information pertaining to the location of the third digital signage board 102c in the store 800, and the one or more apparel product categories ($PC_7$, $PC_8$, $PC_9$) associated with the one or more apparel products ($P_7$, $P_8$, and $P_9$) in vicinity of each of the third digital signage board 102c. In an embodiment, the second metadata may be determined based on the map data.

Further, based on the advertisement displayed on the third digital signage board 102c, and the one or more apparel product categories ($PC_7$, $PC_8$, and $PC_9$) associated with the one or more apparel products ($P_7$, $P_8$, and $P_9$) in vicinity of the third digital signage board 102c, one or more weights ($w_1$, $w_2$, and $w_3$) may be assigned to the one or more apparel product categories ($PC_7$, $PC_8$, and $PC_9$). In an embodiment, the mobile device 104 may compare the one or more weights ($w_1$, $w_2$, and $w_3$) assigned to the one or more apparel product categories ($PC_7$, $PC_8$, and $PC_9$) with a pre-defined threshold weight ($w_t$). In an instance, the weight ($w_1$) assigned to the apparel product category ($PC_7$) may exceed the pre-defined threshold weight ($w_t$). Thus, the apparel product category ($PC_7$), such as "ethnic wear" may be selected as the user preference. Accordingly, the user profile may be updated based on the user preference. Thus, "ethnic wear" may be added in the user profile as a product preference.

In an embodiment, the mobile device 104 may receive the one or more campaign rules corresponding to one or more first campaigns, from the application server 106. In an embodiment, the campaign manager unit 312 may compare each of the one or more campaign rules with the user profile to determine whether each of the one or more campaign rules are relevant to the user. The campaign manager unit 312 may identify the set of campaign rules that are relevant to the user based on the comparison of each of the one or more campaign rules with the user profile. In an embodiment, the campaign manager unit 312 may further be configured to identify a set of user preferences, such as the apparel product category ($PC_7$) from the user profile based on the identified set of campaign rules. In an embodiment, the mobile device 104 may transmit the apparel product category ($PC_7$) to the application server 106 to retrieve the targeted content. To retrieve the targeted content, the mobile device 104 may transmit the apparel product category ($PC_7$) to the application server 106 in accordance with the oblivious transfer (OT) protocol.

In an embodiment, the targeted content may be received on the mobile device 104 from the application server 106. The targeted content may correspond to a coupon, a promotion, and an offer, on the apparel product ($P_7$) that may be of interest to the user.

Figure 9A:
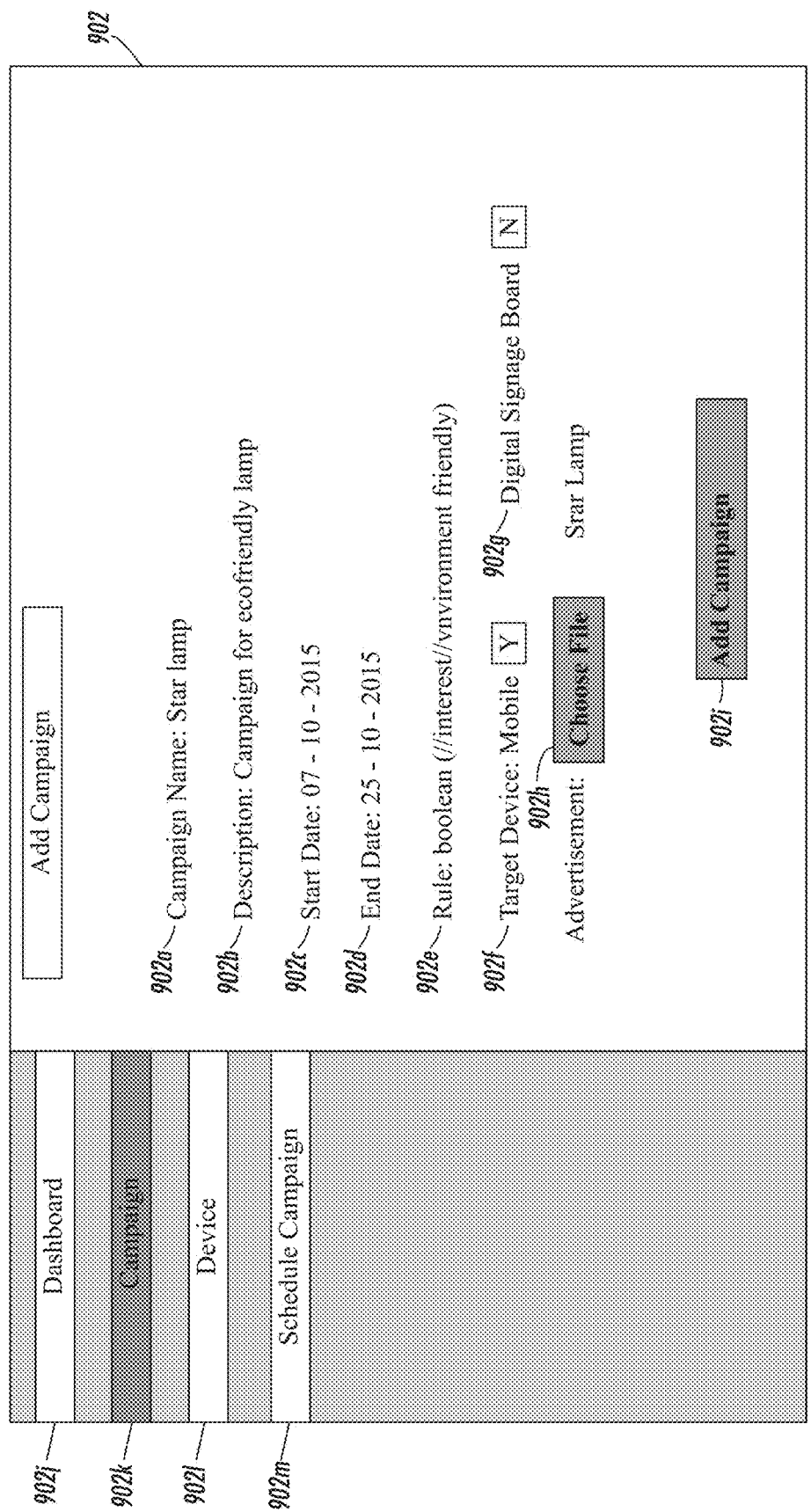
FIGS. 9A, 9B, 9C, and 9D are user interfaces that illustrate a method to create and schedule the content, in accordance with at least one embodiment.
Figure 9B:
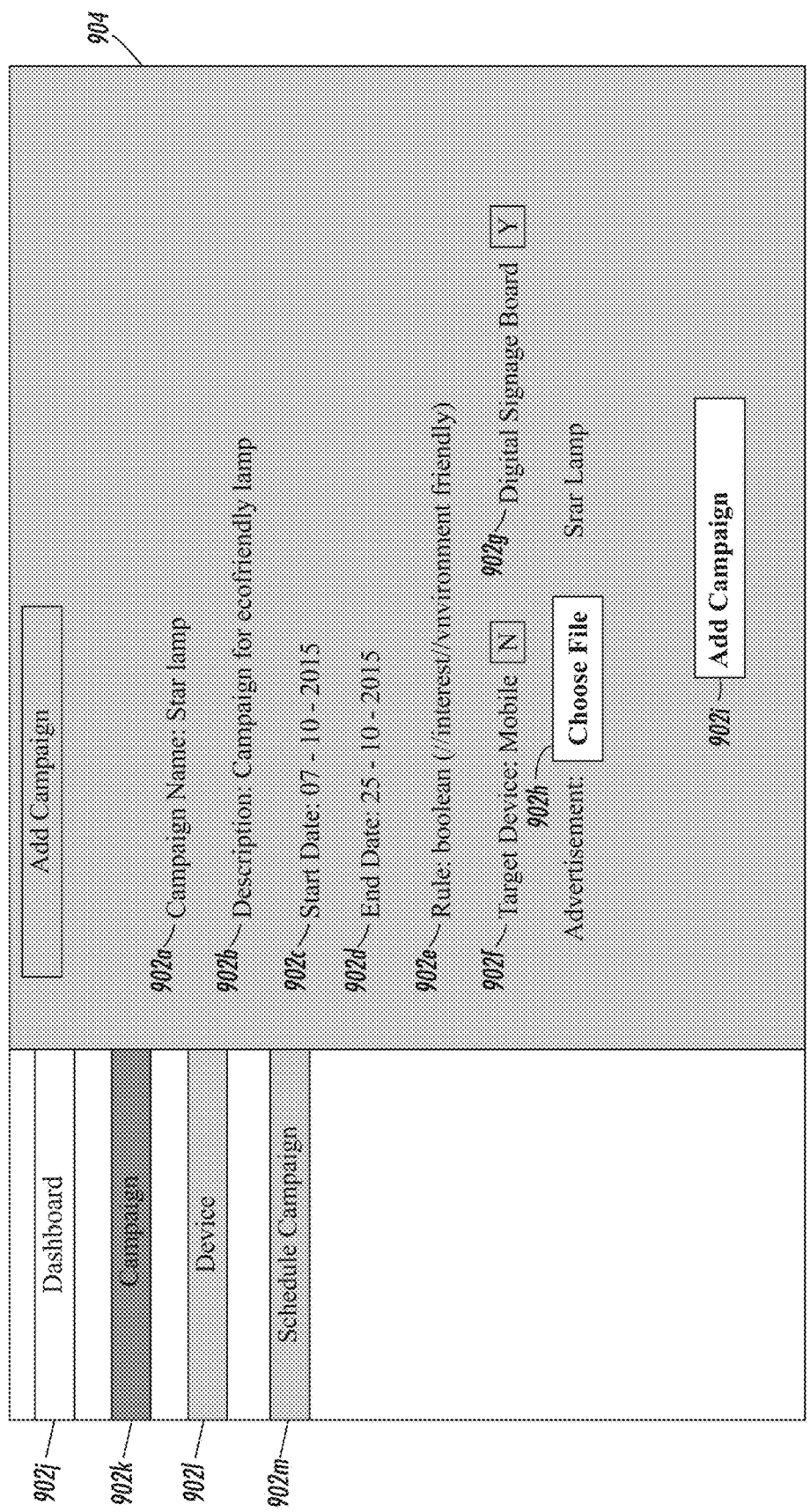
Figure 9C:
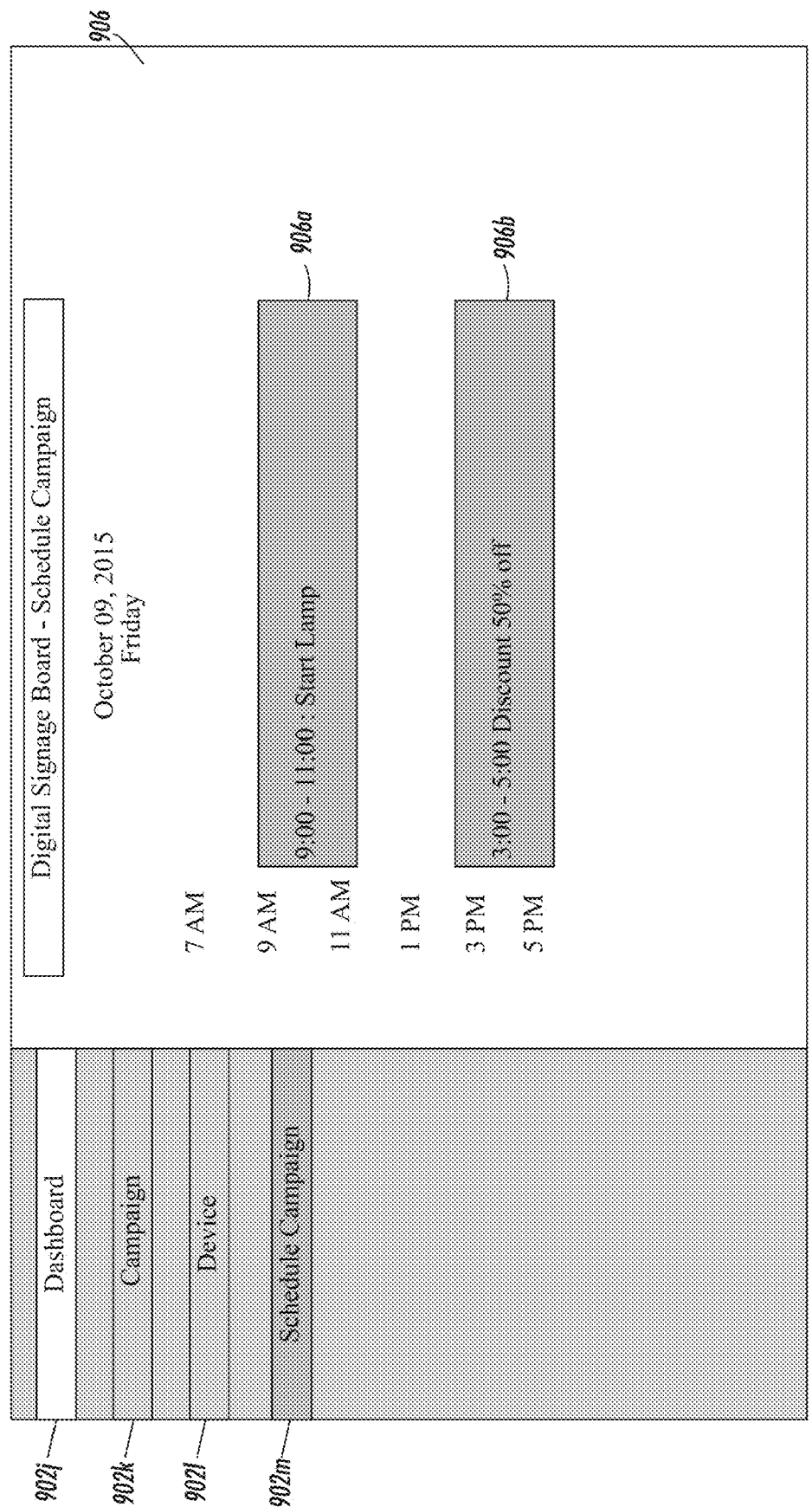
Figure 9D:
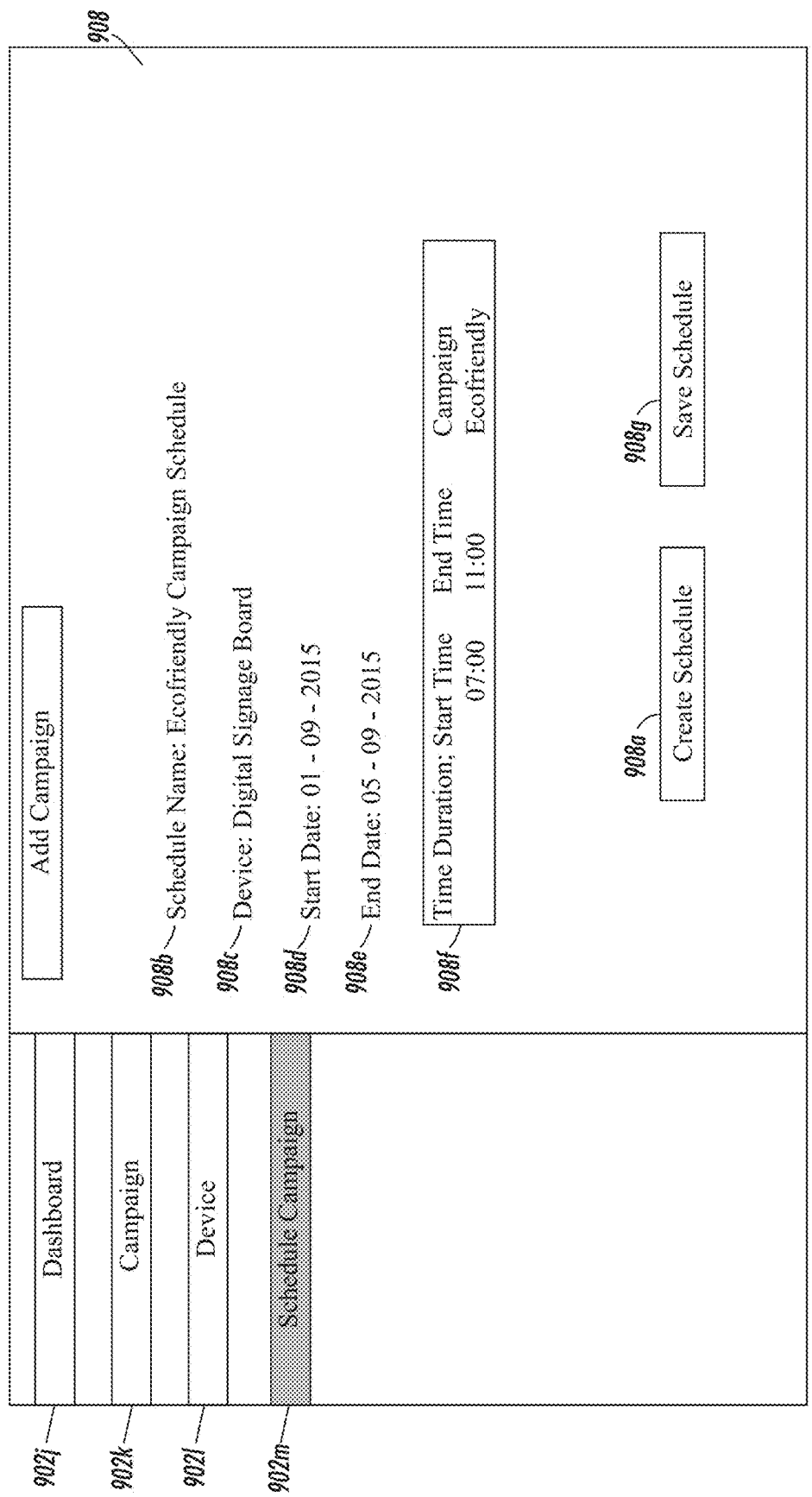

FIGS. 9A, 9B, 9C, and 9D are user interfaces 902, 904, 906, and 908 that illustrate an administrative console to create and schedule the one or more first campaigns and the one or more second campaigns, in accordance with at least one embodiment. FIGS. 9A-9D are described in conjunction with FIGS. 1-8. FIG. 9A represents a user interface 902 to create the one or more first campaigns to be displayed on the mobile device 104. FIG. 9B represents a user interface 904 to create the one or more second campaigns to be displayed on the digital signage board 102. FIG. 9C represents a user interface 906 to view the schedule for the one or more second campaigns, to be displayed on the digital signage board 102. FIG. 9D represents a user interface 906 to schedule the one or more second campaigns to be displayed on the digital signage board 102. The user interface 906 may include four tabs. The first tab 902j may correspond to a dashboard. The second tab 902k may correspond to a campaign. The third tab 902l may correspond to a device. The fourth tab 902m may correspond to a scheduling campaign. When the user clicks on any of the four tabs, further options associated with the tab may be displayed.

In an embodiment, the administrator may create the one or more first campaigns to be displayed on the mobile device 104 utilizing the user interface 902. The user interface 902 may comprise one or more options to specify the one or more first campaigns name (denoted by 902a), a description of the one or more first campaigns (denoted by 902b), a start date (denoted by 902c), an end date (denoted by 902d), a campaign rule (denoted by 902e) associated with each of the one or more first campaigns. In an embodiment, the target device may be selected using the user interface element 902f and the user interface 902g. In an embodiment, the target device selected may be the mobile device 104 if the user interface element 902f shows 'Y'. In an embodiment, the target device selected may be the digital signage board 102 if the user interface element 902g shows 'Y'. In an embodiment, the administrator may upload the advertisement file that may correspond to the first metadata associated with each of the one or more first campaigns, using the control button (denoted by 902h). In such a scenario, the administrator may specify name of the one or more first campaigns, the description of the one or more first campaigns, the start date, the end date, the campaign rule associated with each of the one or more first campaigns, and the targeted device (shown in FIG. 9A). The administrator may click on the 'Add Campaign' button (denoted by 902i) on the user interface 902 to create the one or more first campaigns to be displayed on the mobile device 104. Similarly, the one or more second campaigns may be created by the administrator to be displayed on the digital signage board 102 (shown in FIG. 9B).

After creating the one or more first campaigns for the mobile device 104 and the one or more second campaigns for the digital signage board 102, the administrator may click on the tab 902m on the administrative console. In response to the click event on the tab 902m a, page that corresponds to a view of a calendar (shown in FIG. 9C) is displayed. For example, the advertisement related to star lamp may be displayed from 9 am to 11 am. This duration may be denoted by 906a. Similarly, the advertisement "Discount 50% OFF" may be displayed during 3 pm to 5 pm. This duration may be denoted by 906b. The calendar may be utilized to view the one or more second campaigns scheduled to be displayed on the digital signage board 102 for a given duration. Similarly, the calendar may be used to view the one or more first campaigns scheduled to be displayed on the mobile device 104. In an embodiment, the calendar may present a daily, a weekly, and a monthly view. Further, the administrator may click on an option, such as "Create Schedule" (denoted by 908a) provided on the page described in FIG. 9D and opens a schedule page. On the schedule page, the administrator may select a schedule name (denoted by 908b), a device name (denoted by 908c), a start date (denoted by 908d), an end date (denoted by 908e), and a time duration (denoted by 908f) during which the first content may be displayed on the selected device such as the digital signage board 102. The administrator clicks the save schedule button (denoted by 908g) to schedule the one or more second campaigns for the digital signage board 102.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be RAM or ROM. The computer system further comprises a storage device, which may be a hard-disk drive or a removable storage drive, such as a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as LAN, MAN, WAN, and the Internet. The computer system facilitates inputs from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described may also be implemented using only software programming or hardware or a varying combination of the two techniques. The disclosure is independent of the programming language and the operating system used in computers. The instructions for the disclosure may be written in all programming languages, including, but not limited to, 'C', 'C++', 'Visual C++,' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in various operating systems and platforms including, but not limited to, 'Unix', DOS', 'Android', 'Symbian', and 'Linux'.

The programmable instructions may be stored and transmitted on a computer-readable medium. The disclosure may also be embodied in a computer program product comprising a computer-readable medium, or with any product capable of implementing the above methods and systems, or the numerous possible variations thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Various embodiments of the methods and systems for allocation of the set of computational resources in a distributed computing environment have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims may encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of operating a dual display digital shopping information system,
the method comprising:
scanning a machine-readable code displayed on a digital signage board comprising a first display and a first transceiver, by a user with a mobile device comprising a processor, a second transceiver, and a second display, wherein the digital signage board is in a shopping venue comprising one or more products in vicinity of the digital signage board, the machine-readable code contains a first metadata corresponding to a first content displayed on the digital signage board and comprising a location of the digital signage board, and the first content is received by the digital signage board over a communication network from an application server;
receiving, by the mobile device, a map data of the shopping venue from the application server, wherein the map data comprises a first information pertaining to the location of the digital signage board in the shopping venue, and one or more product categories associated with the one or more products in vicinity of the digital signage board;

extracting, by the mobile device, a second metadata corresponding to the one or more product categories associated with the one or more products in vicinity of the digital signage board, based on the map data;

determining, by the mobile device, a user preference based on the first and second metadata;

sending, by the mobile device, the user preference, to the application server;

assigning, by the application server, a second content based on the user preference;

receiving, by the mobile device, the second content; and displaying the second content on the second display to complement the first content displayed on the digital signage board and provide a dual display digital shopping interface to the user.

2. The method of claim 1, further comprising assigning, by the one or more processors, a weight to each of the one or more product categories.

3. The method of claim 2, further comprising comparing, by the one or more processors, the weight assigned to each of the one or more product categories with a pre-defined threshold.

4. The method of claim 3, further comprising selecting, by the one or more processors, a set of product category from the one or more product categories based on the comparison, wherein the set of product category corresponds to the user preference.

5. The method of claim 4, further comprising receiving, by the one or more processors, a notification on the mobile device based on the scanned machine readable code, wherein the notification corresponds to receiving additional information pertaining to the first content.

6. The method of claim 5, further comprising receiving, by the one or more processors, a user input to accept or reject the notification received on the mobile device.

7. The method of claim 6, further comprising determining, by the one or more processors, a product category of a product corresponding to the first content, wherein the product category corresponds to the user preference.

8. The method of claim 1, wherein the first content corresponds to an advertisement of a product.

9. The method of claim 8, wherein the first metadata further comprises one or more of a product ID of the product, a product name, a product category of the product, a time stamp associated with the first content displayed on the digital signage board, an external URL associated with the product name, and a campaign rule associated with the advertisement.

10. The method of claim 1, wherein the machine-readable code comprises one or more of a QR code, a bar code, and RFID code.

11. The method of claim 1 further comprising creating, by the one or more processors, a user profile based on the user preference, wherein the user profile is stored on the mobile device.

12. The method of claim 1, wherein the second content comprises one of an advertisement, a coupon, a promotion, and an offer.

13. A dual display digital shopping information system comprising:

an application server;

a shopping venue comprising a digital signage board and one or more products in vicinity of the digital signage board, the digital signage board comprising a first display and a first transceiver;

a mobile device comprising one or more processors, a second transceiver, and a second display; and a communication network configured for communication with the mobile device, the application server, and the digital signage board, the mobile device configured to:

scan a machine-readable code displayed on the digital signage board, wherein the machine-readable code contains a first metadata corresponding to a first content displayed on the digital signage board and comprising a location of the digital signage board, and the first content is received by the digital signage board over the communication network from the application server;

receive a map data of the shopping venue from the application server, wherein the map data comprises a first information pertaining to the location of the digital signage board in the shopping venue, and one or more product categories associated with the one or more products in vicinity of the digital signage board;

extract a second metadata corresponding to the one or more product categories associated with the one or more products in vicinity of the digital signage board, based on the map data;

determine a user preference based on the first and second metadata;

send the user preference, to the application server;

assign a second content based on the user preference;

receive the second content; and display the second content on the second display to complement the first content displayed on the digital signage board and provide a dual display digital shopping interface to a user of the mobile device.

14. A non-transitory computer-readable storage medium having stored thereon, a set of computer-executable instructions for causing a mobile device comprising one or more processors to perform steps comprising:

scanning a machine-readable code displayed on a digital signage board comprising a first display and a first transceiver, wherein the digital signage board is in a shopping venue comprising one or more products in vicinity of the digital signage board, the machine-readable code contains a first metadata corresponding to a first content displayed on the digital signage board and comprising a location of the digital signage board, the mobile device further comprises a second display and a second transceiver, and the first content is received by the digital signage board over a communication network from an application server;

receiving, by the mobile device, a map data of the shopping venue from the application server, wherein the map data comprises a first information pertaining to the location of the digital signage board in the shopping venue, and one or more product categories associated with the one or more products in vicinity of the digital signage board;

extracting a second metadata corresponding to the one or more product categories associated with the one or more products in vicinity of the digital signage board, based on the map data;

determining, by the mobile device, a user preference based on the first and second metadata;

sending, by the mobile device, the user preference, to the application server;

assigning, by the application server, a second content based on the user preference;
receiving, by the mobile device, the second content; and
displaying the second content on the second display to complement the first content displayed on the digital signage board and provide a dual display digital shopping interface to a user.

* * * * *